United States Patent
Yasuda et al.

(10) Patent No.: US 8,447,178 B2
(45) Date of Patent: May 21, 2013

(54) IMAGE PICKUP APPARATUS AND METHOD FOR CONTROLLING IMAGE PICKUP APPARATUS

(75) Inventors: Hitoshi Yasuda, Tokyo (JP); Hiroto Okawara, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 70 days.

(21) Appl. No.: 13/152,782

(22) Filed: Jun. 3, 2011

(65) Prior Publication Data
US 2011/0305445 A1    Dec. 15, 2011

(30) Foreign Application Priority Data
Jun. 11, 2010 (JP) .................... 2010-134079

(51) Int. Cl.
*G03B 17/00* (2006.01)
(52) U.S. Cl.
USPC .............................................. 396/78
(58) Field of Classification Search .......... 396/77, 396/78; 348/240.99, 240.3
See application file for complete search history.

(56) References Cited

U.S. PATENT DOCUMENTS

| | | | | |
|---|---|---|---|---|
| 4,942,417 A | * | 7/1990 | Miyazawa et al. | 396/50 |
| 5,113,214 A | * | 5/1992 | Nagata et al. | 396/78 |
| 6,172,706 B1 | * | 1/2001 | Tatsumi | 348/169 |
| 8,045,045 B2 | * | 10/2011 | Okawara | 348/347 |
| 2007/0172221 A1 | * | 7/2007 | Moriya | 396/78 |
| 2011/0305445 A1 | * | 12/2011 | Yasuda et al. | 396/78 |

FOREIGN PATENT DOCUMENTS

| | | |
|---|---|---|
| JP | 09-149311 | 6/1997 |
| JP | 2005-121752 | 5/2005 |

* cited by examiner

*Primary Examiner* — WB Perkey
(74) *Attorney, Agent, or Firm* — Cowan, Liebowitz & Latman, P.C.

(57) ABSTRACT

The image pickup apparatus includes an image production unit producing an image by using an output signal from an image pickup unit, a size detection unit detecting a size of a specific object in the image, a zoom control unit performing auto zoom control that automatically provides a specific zoom operation to make the size of the specific object equal or closer to a target value, and a focus control unit performing focus control of an image taking optical system based on a contrast evaluation value obtained from the image. The zoom control unit is configured to restrict the specific zoom operation in the auto zoom control until a determination is made that an in-focus state of the image taking optical system has been obtained by the focus control.

18 Claims, 12 Drawing Sheets

| | | ∞ | | FOCUS POSITION | | | | CLOSE |
|---|---|---|---|---|---|---|---|---|
| | | n | | | | | | |
| | | 0 | 1 | 2 | 3 | - | k | - | m |
| W | 0 | A (0,0) | A (1,0) | A (2,0) | A (3,0) | - | A (k,0) | - | A (m,0) |
| | 1 | A (0,1) | A (1,1) | A (2,1) | A (3,1) | - | A (k,1) | - | A (m,1) |
| ZOOM AREA | 2 | A (0,2) | A (1,2) | A (2,2) | A (3,2) | - | A (k,2) | - | A (m,2) |
| v | 3 | A (0,3) | A (1,3) | A (2,3) | A (3,3) | - | A (k,3) | - | A (m,3) |
| | | \| | \| | \| | \| | - | \| | - | \| |
| | k | A (0,k) | A (1,k) | A (2,k) | A (3,k) | - | A (k,k) | - | A (m,k) |
| | | \| | \| | \| | \| | - | \| | - | \| |
| T | s | A (0,s) | A (1,s) | A (2,s) | A (3,s) | - | A (k,s) | - | A (m,s) |

IMAGE PICKUP APPARATUS AND METHOD FOR CONTROLLING IMAGE PICKUP APPARATUS

BACKGROUND OF THE INVENTION

1. Field of the Invention

The present invention relates to an image pickup apparatus such as a digital still camera and a digital video camera, and particularly to an image pickup apparatus having an auto zoom function capable of automatically keeping a constant size of an object in a captured image.

2. Description of the Related Art

Some image pickup apparatuses detects in an image (captured image) produced by using an image pickup element a specific object such as a person's face, and performs autofocus on the detected specific object. Moreover, Japanese Patent Laid-Open No. 09-149311 discloses an image pickup apparatus provided with an auto zoom function capable of performing zoom control so as to keep the size of a detected specific object constant in a captured image even though the distance to the specific object changes. Such an auto zoom function (hereinafter also referred to as "auto zoom") stores the size of the specific object in the captured image at its start time as a reference size, and automatically performs the zoom control in a telephoto direction or in a wide-angle direction so as to make the size of the specific object detected thereafter equal to the reference size.

Furthermore, zoom lens units as image taking optical systems being installed in or detachably attached to image pickup apparatuses include a so-called inner focus type lens unit in which a focus lens is disposed further on an image side than a magnification-varying lens (zoom lens). Japanese Patent Laid-Open No. 2005-121752 discloses an inner focus type lens unit that stores plural electronic cams shown in FIG. 9 as data, and selects one of the electronic cams corresponding to a detected object distance. Then, this inner focus type lens unit moves the zoom lens and the focus lens so as to trace the selected electronic cam, thereby performing zooming (variation of magnification while maintaining an in-focus state).

As shown in FIG. 9, from a telephoto side to a wide-angle side, the plural electronic cams become converged, in other words, gaps among the plural electronic cams become reduced. Therefore, when the zoom lens is moved from the telephoto side to the wide-angle side, the in-focus state can be easily maintained by the above electronic cam tracing method. However, from the wide-angle side to the telephoto side, the plural electronic cams become diverged. Thus, it may be impossible to determine one electronic cam to be traced, which may make it difficult to maintain the in-focus state or may require a long time to obtain the in-focus state again after falling into an out-of-focus state.

In addition, starting the zoom control by the auto zoom in the out-of-focus state makes it difficult to obtain the in-focus state in the auto zoom.

SUMMARY OF THE INVENTION

The present invention provides an image pickup apparatus capable of avoiding a difficulty of obtaining an in-focus state during the auto zoom.

The present invention provides as an aspect thereof an image pickup apparatus including an image pickup unit configured to photoelectrically convert an object image formed by an image taking optical system, an image production unit configured to produce an image by using an output signal from the image pickup unit, a size detection unit configured to detect a size of a specific object in the image, a storage unit configured to store a target value of the size of the specific object, a zoom control unit configured to perform auto zoom control that automatically provides a specific zoom operation to make the size of the specific object equal or closer to the target value, and a focus control unit configured to perform focus control of the image taking optical system based on a contrast evaluation value obtained from the image. The zoom control unit is configured to restrict the specific zoom operation in the auto zoom control until a determination is made that an in-focus state of the image taking optical system has been obtained by the focus control.

The present invention provides as another aspect thereof an image pickup apparatus including an image pickup unit configured to photoelectrically convert an object image formed by an image taking optical system, an image production unit configured to produce an image by using an output signal from the image pickup unit, a size detection unit configured to detect a size of a specific object in the image, a storage unit configured to store a target value of the size of the specific object, a zoom control unit configured to perform auto zoom control that automatically provides a specific zoom operation to make the size of the specific object equal or closer to the target value, and a focus control unit configured to perform focus control of the image taking optical system based on a contrast evaluation value obtained from the image. The zoom control unit is configured to provide the specific zoom operation in the auto zoom control in response to a determination that an in-focus state of the image taking optical system has been obtained by the focus control.

The present invention provides as still another aspect thereof an image pickup apparatus including an image pickup unit configured to photoelectrically convert an object image formed by an image taking optical system, an image production unit configured to produce an image by using an output signal from the image pickup unit, a size detection unit configured to detect a size of a specific object in the image, a storage unit configured to store a target value of the size of the specific object, a zoom control unit configured to perform auto zoom control that automatically provides a specific zoom operation to make the size of the specific object equal or closer to the target value, and a focus control unit configured to perform focus control of the image taking optical system based on a contrast evaluation value obtained from the image. In the auto zoom control, the focus control unit is configured to make a determination of whether or not an in-focus state has been obtained by the focus control before the specific zoom operation.

The present invention provides as yet still another aspect thereof a method for controlling an image pickup apparatus including an image pickup unit configured to photoelectrically convert an object image formed by an image taking optical system and an image production unit configured to produce an image by using an output signal from the image pickup unit. The method includes a size detection step of detecting a size of a specific object in the image, a storage step of storing a target value of the size of the specific object to a storage unit, a zoom control step of performing auto zoom control that automatically provides a specific zoom operation to make the size of the specific object equal or closer to the target value, and a focus control step of performing focus control of the image taking optical system based on a contrast evaluation value obtained from the image. In the zoom control step, in the auto zoom control, the specific zoom operation is restricted until a determination is made that an in-focus state of the image taking optical system has been obtained by the focus control.

The present invention provides as still further another aspect thereof a method for controlling an image pickup apparatus including an image pickup unit configured to photoelectrically convert an object image formed by an image taking optical system and an image production unit configured to produce an image by using an output signal from the image pickup unit. The method includes a size detection step of detecting a size of a specific object in the image, a storage step of storing a target value of the size of the specific object to a storage unit, a zoom control step of performing auto zoom control that automatically provides a specific zoom operation to make the size of the specific object equal or closer to the target value, and a focus control step of performing focus control of the image taking optical system based on a contrast evaluation value obtained from the image. In the zoom control step, in the auto zoom control, the specific zoom operation is provided in response to a determination that an in-focus state of the image taking optical system has been obtained by the focus control.

The present invention provides as still further another aspect thereof a method for controlling an image pickup apparatus including an image pickup unit configured to photoelectrically convert an object image formed by an image taking optical system and an image production unit configured to produce an image by using an output signal from the image pickup unit. The method includes a size detection step of detecting a size of a specific object in the image, a storage step of storing a target value of the size of the specific object to a storage unit, a zoom control step of performing auto zoom control that automatically provides a specific zoom operation to make the size of the specific object equal or closer to the target value, and a focus control step of performing focus control of the image taking optical system based on a contrast evaluation value obtained from the image. In the focus control step, in the auto zoom control, a determination of whether or not an in-focus state has been obtained is made before the specific zoom operation.

In addition, the present invention provides as yet still further another aspect thereof a computer readable storage medium storing a computer program that causes an image pickup apparatus to perform operations according to any one of the above-described methods.

Other aspects of the present invention will become apparent from the following description and the attached drawings.

DESCRIPTION OF THE EMBODIMENTS

Exemplary embodiments of the present invention will hereinafter be described with reference to the accompanying drawings.

Embodiment 1

Figure 1:
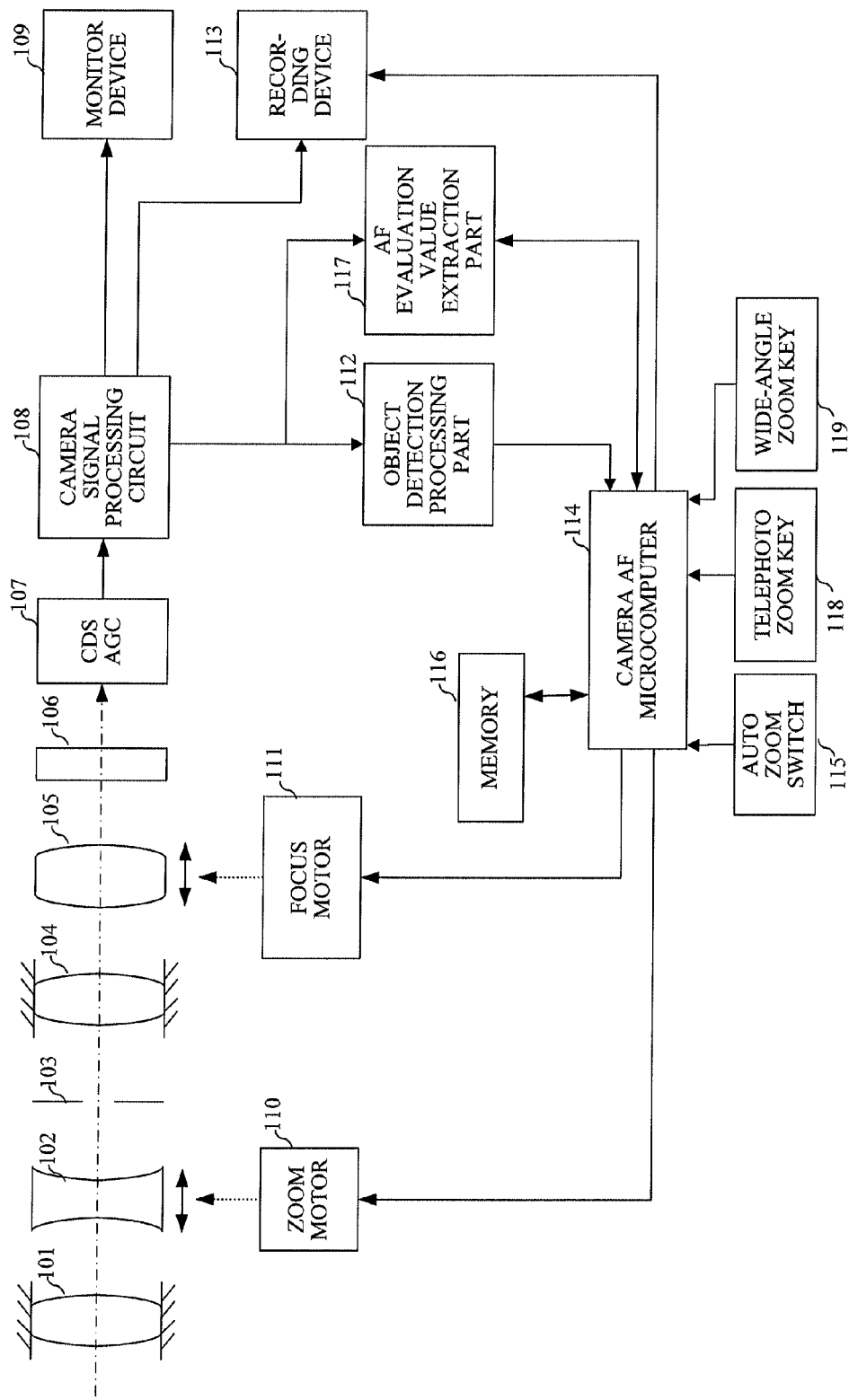
FIG. 1 is a block diagram showing the configuration of an image pickup apparatus that is an embodiment of the present invention.

FIG. 1 shows the configuration of a video camera as an image pickup apparatus that is a first embodiment (Embodiment 1) of the present invention. Although this embodiment will describe the video camera, alternative embodiments of the present invention include a digital still camera having a video capturing function.

Reference numeral 101 denotes a first lens unit that is a fixed lens unit, and reference numeral 102 denotes a second lens unit that moves in an optical axis direction to perform variation of magnification (optical zoom operation). The second lens unit 102 is hereafter referred to as a "magnification-varying lens".

Reference numeral 103 denotes an aperture stop. Reference numeral 104 denotes a third lens unit that is a fixed lens unit. Reference numeral 105 denotes a focus compensator lens unit (hereinafter referred to as a "focus lens") that moves in the optical axis direction to correct image plane variation caused by the variation of magnification and to perform focusing. These lens units 101, 102, 104 and 105 and the aperture stop 103 constitute an image taking optical system. The image taking optical system in this embodiment is an inner focus type zoom lens unit in which the focus lens 105 is disposed further on an image side than the magnification-varying lens 102.

Reference numeral 106 denotes an image pickup element as an image pickup unit that is constituted by a photoelectric conversion element such as a CCD sensor or a CMOS sensor and photoelectrically converts an object image formed by the image taking optical system. Reference numeral 107 denotes a CDS/AGC that performs sampling of an output signal from the image pickup element 106 to adjust a gain thereof. Reference numeral 108 denotes a camera signal processing circuit (image production unit) that performs various image processing on an output signal from the CDS/AGC 107 to produce a video signal (captured image or image data).

Reference numeral 109 denotes a monitoring device that constitutes a display unit. The monitoring device 109 displays the video signal (captured image) produced by the camera signal processing circuit 108, information showing states of the camera and various warnings. Reference numeral 113 denotes a recording device that records the video signal (captured image) produced by the camera signal processing circuit 108 to a recording medium such as an optical disk or a semiconductor memory.

Reference numeral 110 denotes a zoom motor that is a driving source to move the magnification-varying lens 102. Reference numeral 111 denotes a focus motor that is a driving source to move the focus lens 105. These motors 110 and 111 are driven in response to a driving instruction from a camera AF microcomputer 114 to move the corresponding lenses 102 and 105.

Reference numeral 112 denotes an object detection processing part serving as a size detection unit. The object detection processing part 112 performs an object detection process described later on the video signal (captured image) to detect an object region in the captured image. Moreover, the object detection processing part 112 calculates feature amounts of a specific object (that is, a specific object image) included in the object region. The feature amounts include a position and a size (such as a length or an area) of the specific object. The object detection processing part 112 sends the feature amounts of the specific object to the camera AF microcomputer 114.

Methods particularly for detecting a person's face (specific object) in a captured image, which are used in the object detection process, include the following ones as examples:

(1) a method of extracting a skin color region from colors (tones) of pixels constituting the captured image, and detecting the face depending on a matching degree of the skin color region with a face outline plate that is prepared beforehand; and (2) a method of extracting face feature parts such as eyes, a nose and a mouth from the captured image by using a pattern recognition technology to detect the face.

This embodiment can use any one of the above two methods (1) and (2) in the object detection process, and may use other methods. Moreover, the specific object may be an object other than the person's face. In addition, a method may be used which provides an object specifying unit for enabling a user to specify the specific object and detects an object region including the specific object from luminance information or color information of the specific object in a captured image by using a pattern matching technology.

Reference numeral 117 denotes an AF evaluation value extraction part. The AF evaluation value extraction part 117 extracts, from an AF region signal that has passed through an AF gate, a high-frequency component to produce an AF evaluation value signal. The AF gate passes only the AF signal region signal of the video signal (captured image). The AF evaluation value is a contrast evaluation value showing contrast (sharpness) of the video signal (captured image) produced based on the output signal from the image pickup element 106. The contrast is changed with a focus state of the image taking optical system, so that the AF evaluation value signal is a signal indicating the focus state of the image taking optical system. The AF evaluation value signal is output to the camera AF microcomputer 114.

The camera AF microcomputer 114 governs control of all operations of the video camera, controls a position of the magnification-varying lens 102 through auto zoom control, and controls a position of the focus lens 105 through autofocus control. The camera AF microcomputer 114 serves as a zoom control unit and a focus control unit. The auto zoom control and the autofocus control are hereinafter simply referred to as "auto zoom" and "autofocus (AF)", respectively.

Reference numeral 115 denotes an auto zoom switch that is operated by a user to turn the auto zoom ON (active) and OFF (non-active). The camera AF microcomputer 114 starts the auto zoom in response to an ON signal from the auto zoom switch 115, and ends the auto zoom in response to an OFF signal therefrom.

Reference numeral 116 denotes a memory (storage unit) that is constituted by a DRAM, a flash ROM or the like, and stores computer programs and data used in various processes performed by the camera AF microcomputer 114, the processes including the auto zoom and the autofocus. The memory 116 also stores data of a reference size as a target value used for keeping a size of the specific object in the auto zoom.

Reference numerals 118 and 119 respectively denote a telephoto zoom key and a wide-angle zoom key which constitute a zoom instruction unit. The telephoto and wide-angle zoom keys 118 and 119 are operated by the user to instruct variation of magnification (zoom operation) in a telephoto direction and in a wide-angle direction, respectively. The camera AF microcomputer 114 performs zoom control that moves the magnification-varying lens 102 in a direction (telephoto or wide-angle direction) corresponding to a zoom instruction signal from an operated one of the telephoto and wide-angle zoom keys 118 and 119. The zoom control in response to the operation of the telephoto and wide-angle zoom keys 118 and 119 are hereinafter referred to as "normal zoom (control)".

Figure 3:
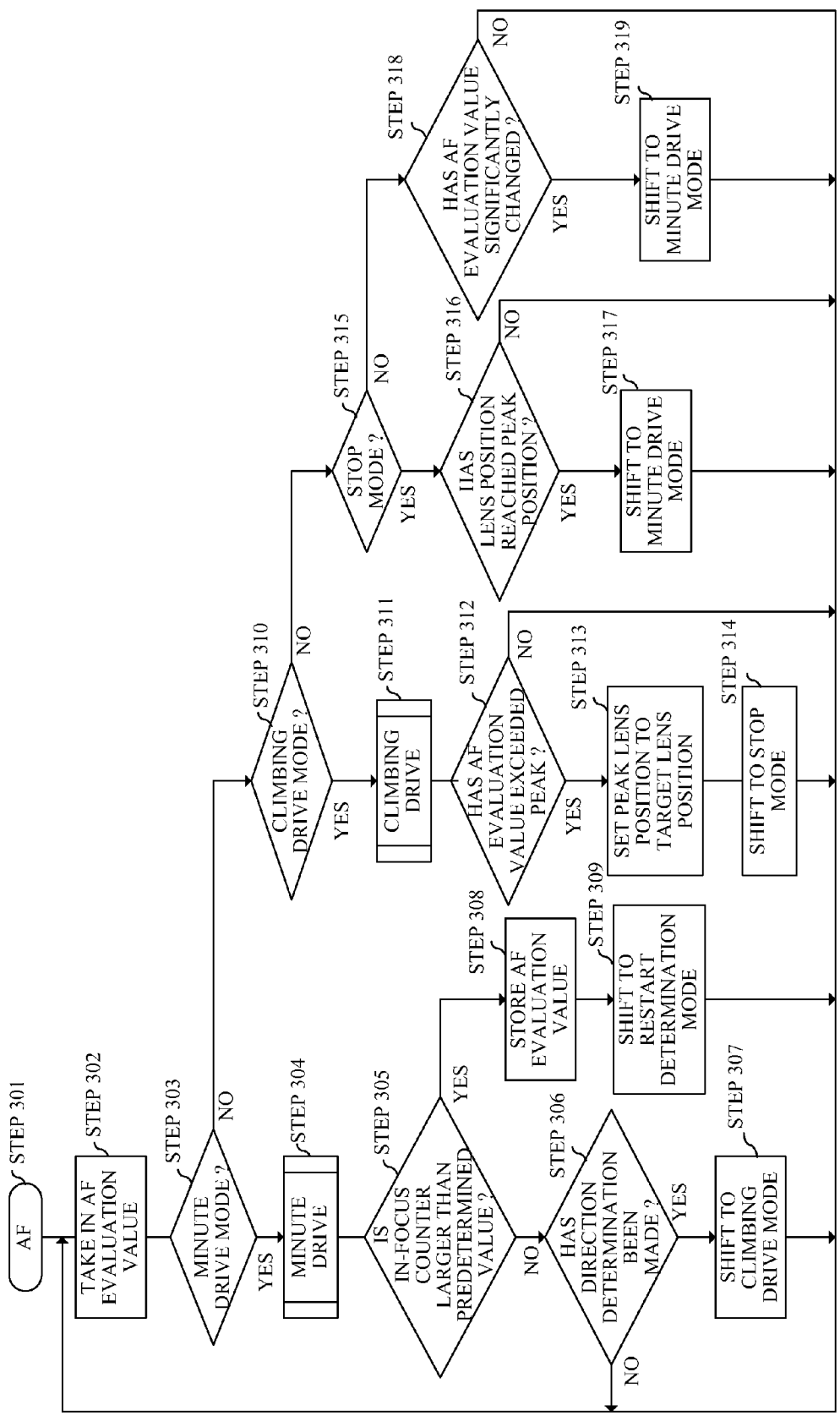
FIG. 3 is a flowchart showing an AF process performed in the image pickup apparatus of the embodiment.

Next, description will be made of an AF process performed in a state other than during zoom operations in the auto zoom and normal zoom performed by the camera AF microcomputer 114 with reference to a flowchart shown in FIG. 3. The camera AF microcomputer 114 executes this AF process according to the above-described computer program stored in the memory 116.

At step 301, the camera AF microcomputer (hereinafter simply referred to as a "microcomputer") 114 starts the AF process.

At step 302, the microcomputer 114 takes in the AF evaluation value from the AF evaluation value extraction part 117.

At step 303, the microcomputer 114 determines whether or not an AF operation mode is a minute drive mode. If the AF operation mode is the minute drive mode, the microcomputer 114 proceeds to step 304 and subsequent steps to perform a minute drive process. If the AF operation mode is not the minute drive mode, the microcomputer 114 proceeds to step 310

At step 304, the microcomputer 114 performs minute drive to move the focus lens 105 alternately in an infinitely-far direction and a close direction with a minute amplitude that generates no visible change in focus state in the captured image. Then, the microcomputer 114 determines that, of the infinitely-far and close directions, one direction in which the AF evaluation value increases is a direction (hereinafter referred to as an "in-focus direction) in which an in-focus position exists. A detailed description of the minute drive will be made later with reference to FIG. 4.

At step 305, the microcomputer 114 determines whether or not an in-focus counter has reached a predetermined value or more at step 304. The in-focus counter will be described later. If a determination (hereinafter referred to as an "in-focus determination") is made that the image taking optical system is in an in-focus state in response to the predetermined value or more of the in-focus counter, the microcomputer 114 proceeds to step 308 to store (hold) the AF evaluation value at the in-focus determination, and then proceeds to step 309 to enter a restart determination mode. After completion of step 309, the microcomputer 114 returns to step 302. On the other hand, if the in-focus determination is not made, the microcomputer 114 proceeds to step 306.

At step 306, the microcomputer 114 determines whether or not the in-focus direction has been determined at step 304. If the in-focus direction has been determined, the microcomputer 114 proceeds to step 307 to shift the AF operation mode to a climbing drive mode. After completion of step 307, the microcomputer 114 returns to step 302. On the other hand, if the in-focus direction has not been determined, the microcomputer 114 returns to step 302 to continue the minute drive.

At step 310, the microcomputer 114 determines whether or not the AF operation mode is the climbing drive mode. If the AF operation mode is the climbing drive mode, the microcomputer 114 proceeds to step 311 and subsequent steps. If the AF operation mode is not the climbing drive mode, the microcomputer 114 proceeds to step 315.

At step 311, the microcomputer 114 performs the climbing drive to move the focus lens 105 at a predetermined speed in a direction in which the AF evaluation value increases. A detailed description of the climbing drive will be made later with reference to FIG. 6.

At step 312, the microcomputer 114 determines whether or not the AF evaluation value has exceeded a peak in the climbing drive started at step 311. If the AF evaluation value has exceeded the peak, the microcomputer 114 proceeds to step 313. If the AF evaluation value has not exceeded the peak, the microcomputer 114 returns to step 302 to continue the climbing drive.

At step 313, the microcomputer 114 sets, in order to return the focus lens 105 to a peak position at which the AF evaluation value reached the peak in the climbing drive, the peak position to a target lens position.

At step 314, the microcomputer 114 shifts the AF operation mode to a stop mode. After completion of step 314, the microcomputer 114 returns to step 302.

At step 315, the microcomputer 114 determines whether or not the AF operation mode is the stop mode. If the AF operation mode is the stop mode, the microcomputer 114 proceeds to step 316 and subsequent steps. If the AF operation mode is not the stop mode, the microcomputer 114 proceeds to step 318.

At step 316, the microcomputer 114 determines whether or not the focus lens 105 has returned to the above-described target lens position. If the focus lens 105 has returned to the target lens position, the microcomputer 114 proceeds to step 317 to shift the AF operation mode to the minute drive mode. After completion of step 317, the microcomputer 114 returns to step 302. If the focus lens 105 has not returned to the target lens position, the microcomputer 114 returns to step 302 to continue returning of the focus lens 105 to the target lens position.

At step 318, the microcomputer 114 compares a current AF evaluation value with the AF evaluation value held at step 308 to determine whether or not the AF evaluation value has changed by a predetermined amount or more, that is, has significantly changed. If the AF evaluation value has significantly changed, the microcomputer 114 proceeds to step 319 to shift the AF operation mode to the minute drive mode. After completion of step 309, the microcomputer 114 returns to step 302. If the AF evaluation value has not significantly changed, the microcomputer 114 returns to step 302.

Figure 4:
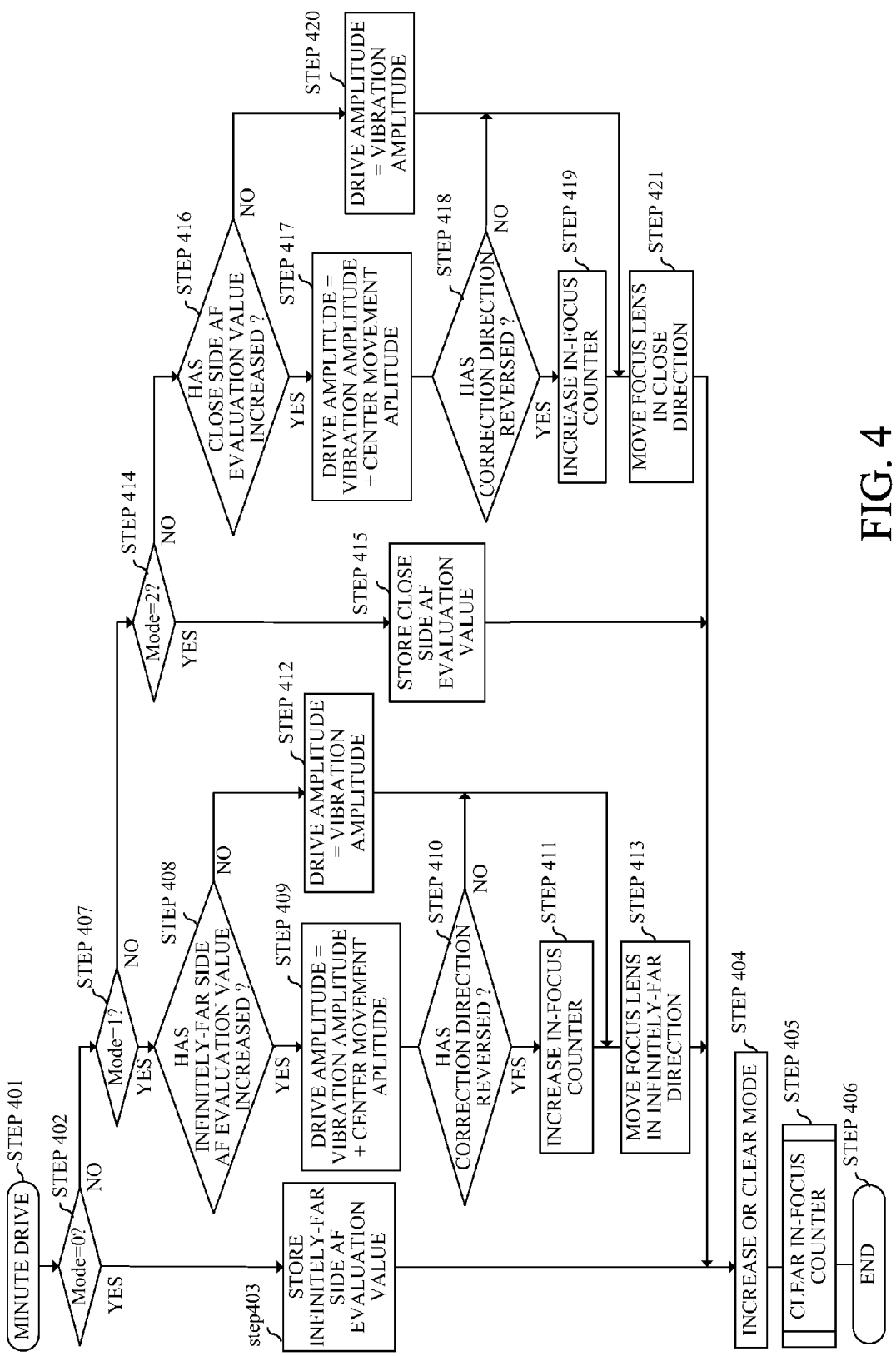
FIG. 4 is a flowchart showing a minute drive process performed in the image pickup apparatus of the embodiment.

Next, description of the minute drive will be made with reference to FIG. 4. At step 401, the microcomputer 114 starts the process of the minute drive. At step 402, the microcomputer 114 determines whether or not a current minute drive mode is 0. If the minute drive mode is 0, the microcomputer 114 proceeds to step 403 for a case where the focus lens 105 is located on a close side. If the minute drive mode is not 0, the microcomputer 114 proceeds to step 407.

At step 403, the microcomputer 114 first stores (holds) the AF evaluation value as a process for the case where the focus lens 105 is located on the close side. The AF evaluation value held here has been obtained from the video signal produced by using electrical charges accumulated in the image pickup element 106 when the focus lens 105 is located on an infinitely-far side at step 415 described later. After completion of step 403, the microcomputer 114 proceeds to step 404.

At step 407, the microcomputer 114 determines whether or not the current minute drive mode is 1. If the minute drive mode is 1, the microcomputer 114 proceeds to step 408 and subsequent steps for the case where the focus lens 105 is located on the infinitely-far side. If the minute drive mode is not 1, the microcomputer 114 proceeds to step 414.

At step 408, the microcomputer 114 compares the AF evaluation value on the infinitely-far side held at step 403 with the AF evaluation value on the close side held at step 415 described later. If the AF evaluation value on the infinitely-far side is larger than the AF evaluation value on the close side, the microcomputer 114 proceeds to step 409. If the AF evaluation value on the close side is larger than the AF evaluation value on the infinitely-far side, the microcomputer 114 proceeds to step 412.

At step 409, the microcomputer 114 calculates a drive amplitude (modulation amplitude) by adding a center movement amplitude to a vibration amplitude. The center movement amplitude is a movement amount of a vibration center which will be described later.

At step 412, the microcomputer 114 sets the vibration amplitude to the drive amplitude. These drive amplitudes are set within a depth of focus.

At step 410, the microcomputer 114 determines whether or not a drive direction (correction direction) of the focus lens 105 has been reversed to a previous drive direction. If the correction direction has been reversed, the microcomputer 114 proceeds to step 411 to increase the in-focus counter by one, and then proceeds to step 413. If the correction direction has not been reversed, the microcomputer 114 directly proceeds to step 413.

At step 413, the microcomputer 114 moves the focus lens 105 in the infinitely-far direction by the drive amplitude set at step 409 or step 412. Then, the microcomputer 114 proceeds to step 404.

At step 414, the microcomputer 114 determines whether or not the current minute drive mode is 2. If the minute drive mode is 2, the microcomputer 114 proceeds to step 415 for the case where the focus lens 105 is located on the infinitely-far side. If the minute drive mode is not 2, the microcomputer 114 proceeds to step 416.

At step 415, the microcomputer 114 stores (holds) the AF evaluation value as a process for the case where the focus lens 105 is located on the infinitely-far side. The AF evaluation value held here has been obtained from the video signal produced by using electrical charges accumulated in the image pickup element 106 when the focus lens 105 is located on the close side at step 403. After completion of step 415, the microcomputer 114 proceeds to step 404.

At step 416, the microcomputer 114 compares the AF evaluation value on the close side held at step 415 with the AF evaluation value on the infinitely-far side held at step 403. If the AF evaluation value on the close side is larger than the AF evaluation value on the infinitely-far side, the microcomputer 114 proceeds to step 417. If the AF evaluation value on the infinitely-far side is larger than the AF evaluation value on the close side, the microcomputer 114 proceeds to step 420.

At step 417, the microcomputer 114 calculates the drive amplitude by adding the vibration amplitude to the center movement amplitude.

At step 418, the microcomputer 114 sets the vibration amplitude to the drive amplitude. These drive amplitudes are set within the depth of focus.

At step 418, the microcomputer 114 determines whether or not the drive direction (correction direction) of the focus lens 105 has been reversed to the previous drive direction. If the correction direction has been reversed, the microcomputer 114 proceeds to step 419 to increase the in-focus counter by one, and then proceeds to step 421. If the correction direction has not been reversed, the microcomputer 114 directly proceeds to step 421.

At step 421, the microcomputer 114 moves the focus lens 105 in the close direction by the drive amplitude set at step 417 or step 420. Then, the microcomputer 114 proceeds to step 404. Thus, reciprocating movement of the focus lens 105 in the infinitely-far and close directions is repeated in a predetermined movement range in response to changes of the AF evaluation value, and thereby the value of the in-focus counter is increased every movement.

At step 404, if the current minute drive mode is 3, the microcomputer 114 changes it to 0. If the minute drive mode is not 3, the microcomputer 114 increases the minute drive mode by 1, and then proceeds to step 405.

At step 405, the microcomputer 114 clears the in-focus counter in response to situations, for example, a case where a determination has been made that the AF evaluation value has been significantly changed due to a change of an object state and a case where the focus lens 105 has been moved out of the predetermined movement range. Then, the microcomputer 114 proceeds to step 406 to end the process.

Figure 5A:
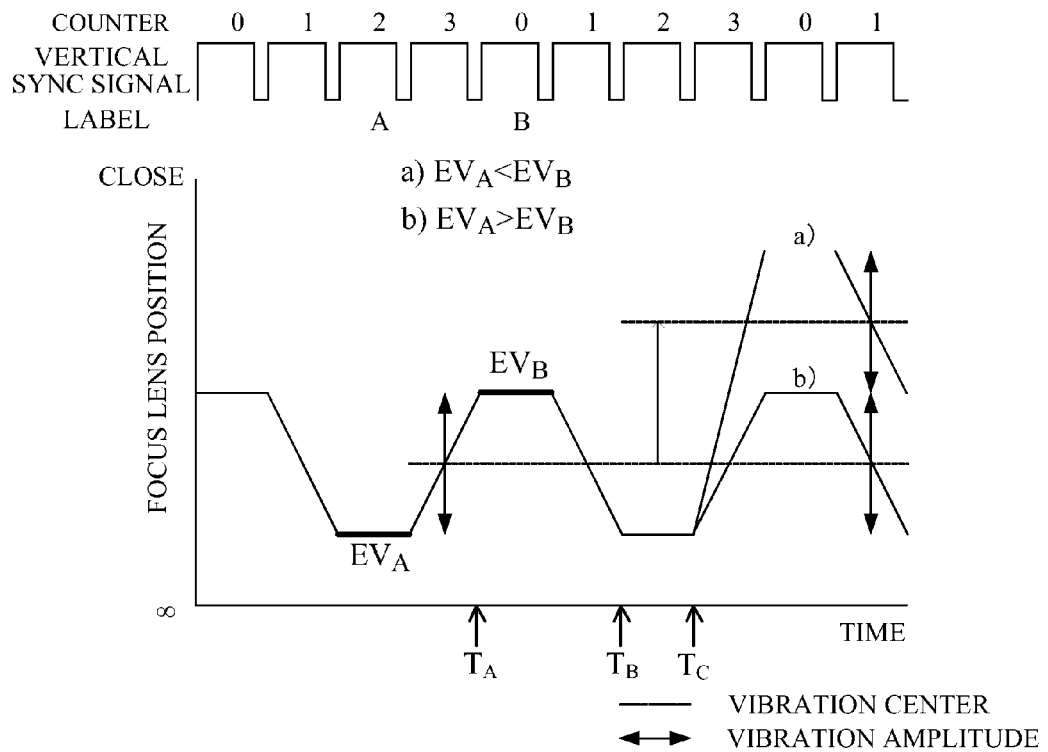
FIG. 5A shows a normal minute drive in the image pickup apparatus of the embodiment.

FIG. 5A shows the movement of the focus lens 105 in the AF process. The upper part of FIG. 5A shows a vertical synchronization signal of the video signal. A horizontal axis in FIG. 5A shows time, and a vertical axis therein shows the position of the focus lens 105 (hereinafter referred to as a "focus lens position").

An AF evaluation value $EV_A$ obtained from the video signal produced by using electric charges accumulated in the image pickup element 106 during a time period labeled with A is taken into the microcomputer 114 at a time $T_A$. An AF evaluation value $EV_B$ obtained from the video signal produced by using electric charges accumulated in the image pickup element 106 during a time period labeled with B is taken into the microcomputer 114 at a time $T_B$. At a time $T_C$, the microcomputer 114 compares the AF evaluation value $EV_A$ with the AF evaluation value $EV_B$, and moves the above-described vibration center only when $EV_B$ is larger than $EV_A$. Moving the vibration center to a direction in which the AF evaluation value increases enables searching for an in-focus position. A movement amount of the focus lens 105 here is set, based on the depth of focus, to a movement amount that generates no visible change in focus state in the captured image.

Figure 6:
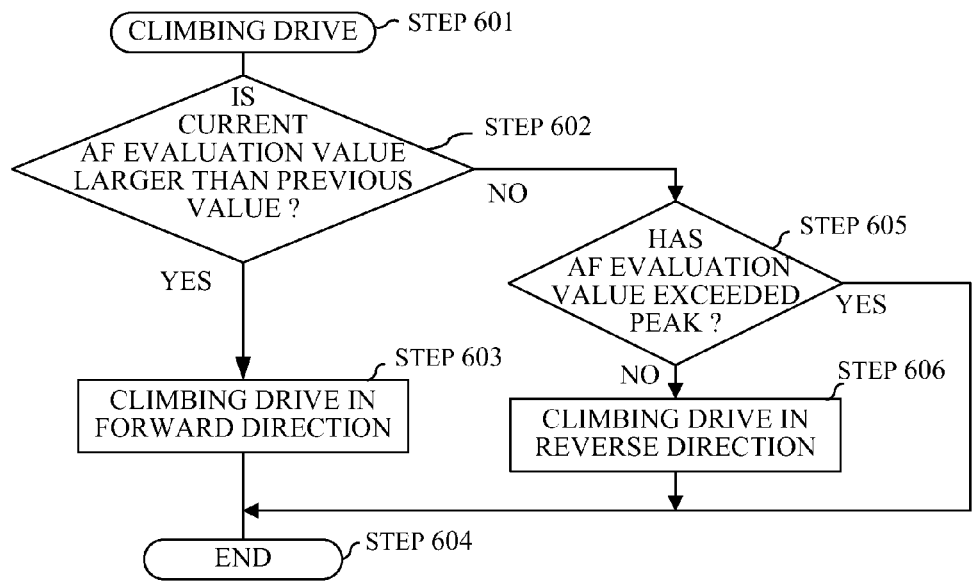
FIG. 6 is a flowchart showing a climbing drive process performed in the image pickup apparatus of the embodiment.

Next, description of the climbing drive will be made with reference to FIG. 6. At step 601, the microcomputer 114 starts the process of the climbing drive. At step 602, the microcomputer 114 determines whether or not the AF evaluation value currently obtained is larger than the AF evaluation value previously obtained. If the current AF evaluation value is larger than the previous AF evaluation value, the microcomputer 114 proceeds to step 603. If the current AF evaluation value is smaller than the previous AF evaluation value, the microcomputer 114 proceeds to step 605.

At step 603, the microcomputer 114 moves the focus lens 105 at a predetermined speed in a same direction (forward direction) as that of a previous movement, and then proceeds to step 604 to end this process.

At step 605, the microcomputer 114 determines whether or not the AF evaluation value has exceeded its peak and has then decreased. If the AF evaluation value has not exceeded the peak, the microcomputer 114 proceeds to step 606. If the AF evaluation value has exceeded the peak and has then decreased, the microcomputer 114 proceeds to step 604 to end this process and then shifts to the minute drive.

At step 606, the microcomputer 114 moves the focus lens 105 at the predetermined speed in a reverse direction to that at the previous movement, and then proceeds to step 604 to end this process.

Figure 7:
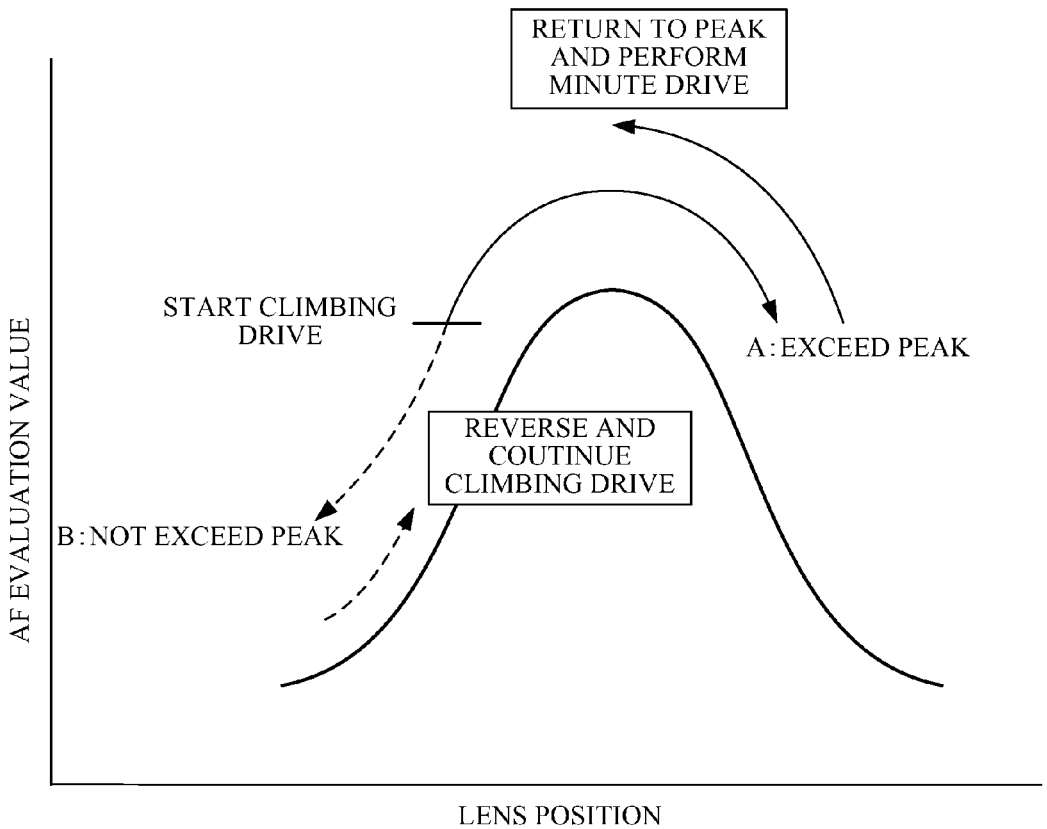
FIG. 7 shows an example of the climbing drive process in the image pickup apparatus of the embodiment.

FIG. 7 shows movements of the focus lens 105 by the climbing drive. In a movement A, the AF evaluation value exceeds its peak and then decreases, so that the microcomputer 114 determines that an in-focus position exists within the movement A, and then ends the climbing drive to shift to the minute drive. On the other hand, in a movement B, the AF evaluation value decreases without a peak, so that the microcomputer 114 determines that it has mistaken the in-focus direction and therefore reverses the drive direction of the focus lens 105 to continue the climbing drive.

As described above, the microcomputer 114 controls the position of the focus lens 105 to maintain an in-focus state such that the AF evaluation value always becomes maximum while repeating "minute drive"→"climbing drive"→"stop"→"minute drive"→"restart determination"→"minute drive".

Figure 8A:
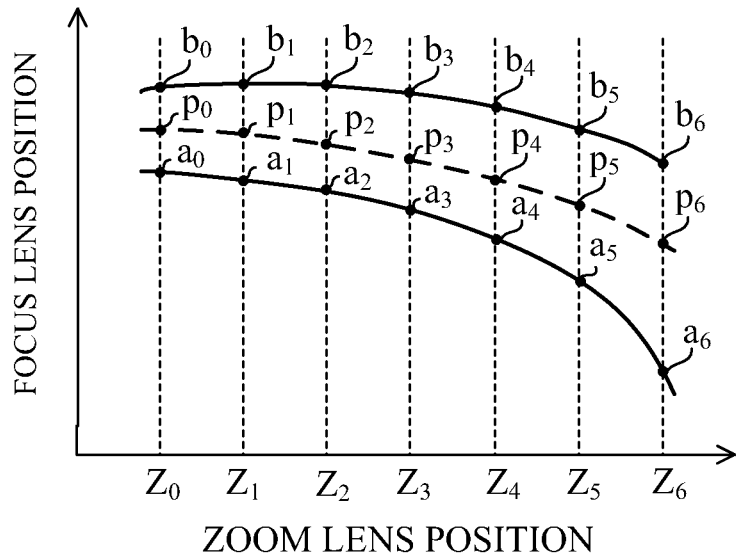
FIG. 8A shows a focus lens electronic cam tracing control method in the image pickup apparatus of the embodiment.

Next, a detailed description of an AF process performed during the zoom operation by the microcomputer 114 will be made. First, description will be made of an example of a focus lens electronic cam tracing control method with reference to FIG. 8A. In FIG. 8A, $Z_0, Z_1, Z_2, \ldots, Z_6$ show positions of the magnification varying lens (hereinafter also referred to as a "zoom lens") 102. Moreover, $a_0, a_1, a_2, \ldots, a_6$ and $b_0, b_1, b_2, \ldots, b_5$ show positions of the focus lens 105 corresponding to two object distances prestored in the microcomputer 114. Each of groups of these focus lens positions (a group of $a_0, a_1, a_2, \ldots, a_6$ and a group $b_0, b_1, b_2, \ldots, b_6$) is a representative in-focus cam that is an electronic cam to be traced by the focus lens 105 in order to maintain an in-focus state at each representative object distance.

Furthermore, $p_0, p_1, p_2, \ldots, p_6$ are positions on a virtual in-focus cam to be traced by the focus lens 105, the virtual in-focus cam being calculated based on the above-described two representative in-focus cams. The position on the virtual in-focus cam is calculated by using the following expression:

$$p_{n+1}=|p_n-a_n|/|b_n-a_n|\times b_{n+1}-a_{n+1}|+a_{n+1} \quad (1)$$

With the above expression (1), when for example the focus lens 105 is located at $p_0$ in FIG. 8A, a ratio (internal division ratio) at which $p_0$ internally divides a line segment $b_0$–$a_0$ is calculated, and a point that internally divides a line segment $b_1$–$a_1$ according to this ratio is defined as $p_1$. Then, from a difference $p_1$–$p_0$ between the positions $p_0$ and $p_1$ and from a time required for the zoom lens 102 to be moved from $Z_0$ to $Z_1$, a movement speed of the focus lens 105 in order to maintain the in-focus state is calculated.

Figure 8B:
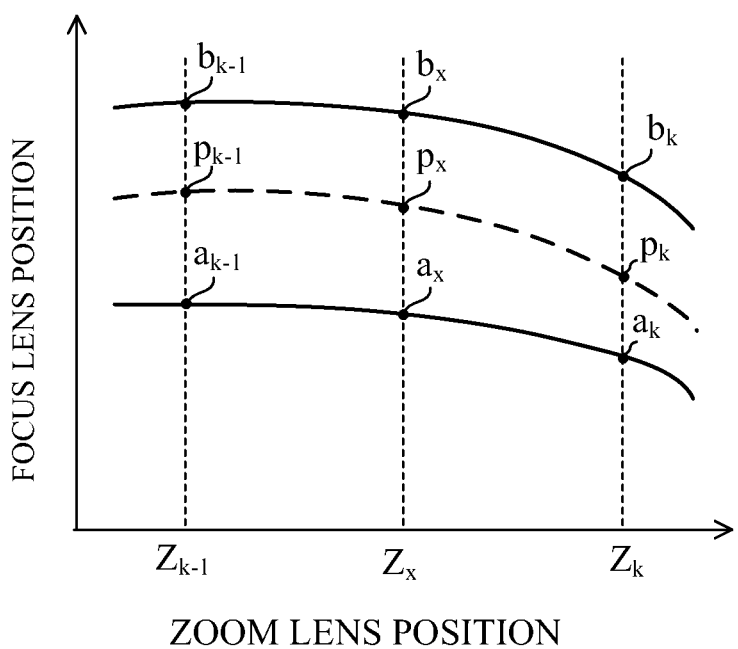
FIG. 8B shows a focus lens position interpolation calculation method in the image pickup apparatus of the embodiment.

Next, description will be made of a case where a stop position of the zoom lens 102 is not restricted to positions located on boundaries of zoom areas, the representative in-focus cam data being provided on the boundaries. FIG. 8B shows a focus lens position interpolation calculation method, wherein part of FIG. 8A is extracted and the zoom lens 102 is located at an arbitrary position. In FIG. 8B, a vertical axis shows the position of focus lens 105 (focus lens position) and a horizontal axis shows the position of the zoom lens 102 (hereinafter referred to as a "zoom lens position"). When the zoom lens positions are shown by $Z_0, Z_1, \ldots, Z_{k-1}, Z_k, \ldots, Z_n$, the focus lens positions on the representative in-focus cams for two representative object distances, which are stored in the microcomputer 114, are shown by $a_0, a_1, \ldots, a_{k-1}, a_k, \ldots, a_n$ and $b_0, b_1, \ldots, b_{k-1}, b_k, \ldots, b_n$.

In a case where the zoom lens position is $Z_x$, which is not on the boundary of the zoom area, and the focus lens position is $P_x$, $a_x$ and $b_x$ are calculated as follows:

$$a_x = a_k - (Z_k - Z_x)(a_k - a_{k-1})/(Z_k - Z_{k-1}) \quad (2)$$

$$b_x = b_k - (Z_k - Z_x)(b_k - b_{k-1})/(Z_k - Z_{k-1}) \quad (3)$$

In other words, the internal division ratio is calculated from a current zoom lens position and positions of two zoom area boundaries (for example, $Z_k$ and $Z_{k-1}$ in FIG. 8B) located on both sides of the current zoom lens position. Then, $a_x$ and $b_x$ can be calculated by internally dividing two positions corresponding to a same object distance among the prestored four focus lens positions on the representative in-focus cams ($a_k$, $a_{k-1}$, $b_k$ and $b_{k-1}$ in FIG. 8B) with the above-described internal division ratio.

In addition, according to the internal division ratio obtained from $a_x$, $p_x$ and $b_x$, $p_k$ and $p_{k-1}$ can be calculated by internally dividing two positions corresponding to a same focal length among the prestored four focus lens positions on the representative in-focus cams with the above-described internal division ratio, as shown by the expression (1).

When zooming from the wide-angle side to the telephoto side is performed, the movement speed of the focus lens 105 to maintain an in-focus state is calculated from the difference between the focus lens position $p_k$ that is a tracing destination and the current focus lens position $p_x$, and from the time required for the zoom lens 102 to be moved from $Z_x$ to $Z_k$. Further, when zooming from the telephoto side to the wide-angle side is performed, the movement speed of the focus lens 105 to maintain an in-focus state is calculated from the difference between the focus lens position $p_{k-1}$ that is a tracing destination and the current focus lens position $p_x$, and from the time required for the zoom lens 102 to be moved from $Z_x$ to $Z_{k-1}$.

Figures 8C, 9:
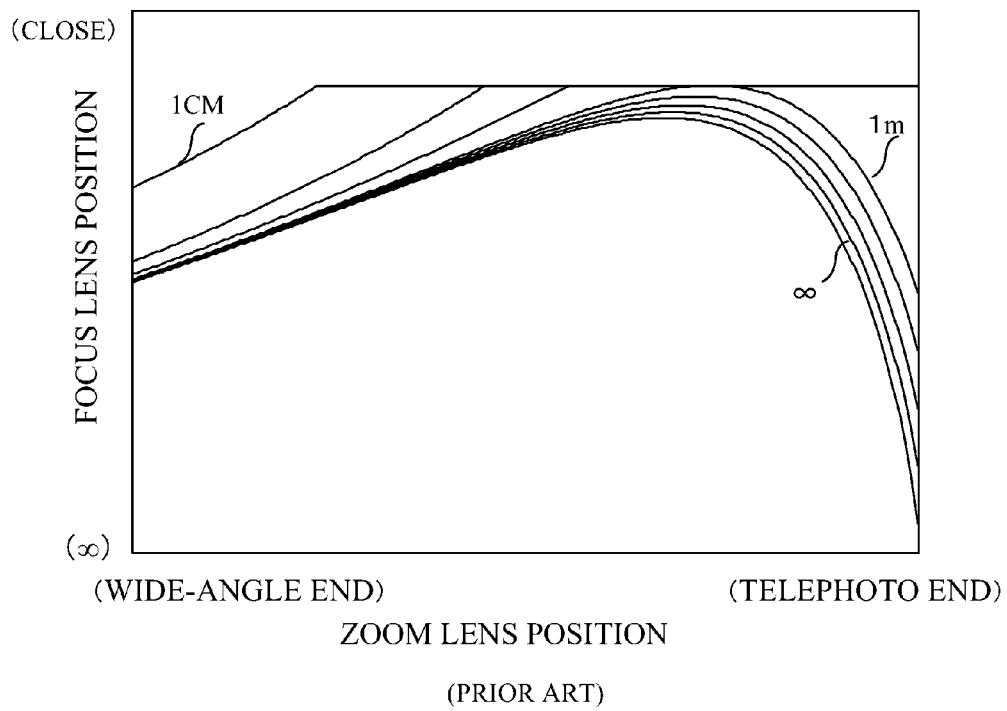
FIG. 8C shows an example of table data of representative in-focus cams in the image pickup apparatus of the embodiment.
FIG. 9 shows representative in-focus cams of a conventional inner focus type lens unit.

FIG. 8C shows an example of table data of the representative in-focus cams prestored in the microcomputer 114. FIG. 8C shows in-focus position (focus lens position) data A(n,v) for each object distance, the data changing with the zoom lens position. The object distance shown by a variable n changes in a horizontal (column) direction, and the zoom lens position (focal length) shown by a variable v changes in a vertical (low) direction. In this table, n=0 denotes an infinitely-far object distance, and the object distance changes to the close side as n increases. For, example, n=m denotes an object distance of 1 cm.

On the other hand, v=0 denotes a wide-angle end. In addition, the focal length increases as v increases, and v=s denotes a telephoto end. Therefore, one representative in-focus cam is drawn by the table data in one low. In other words, with the movement of the zoom lens 102, selecting one electronic cam corresponding to the object distance among the plural electronic cams shown in FIG. 9 so as to move the focus lens 105 according to the selected electronic cam by the above-described method enables a zoom operation while maintaining an in-focus state, that is, zooming.

However, as described above, when the zoom lens 102 is moved from the wide-angle side to the telephoto side, one electronic cam to be traced by the focus lens 105 among the plural electronic cams cannot be determined since the plural electronic cams are mutually converged on the wide-angle side, and therefore it may be impossible to maintain an in-focus state.

Figure 5B:
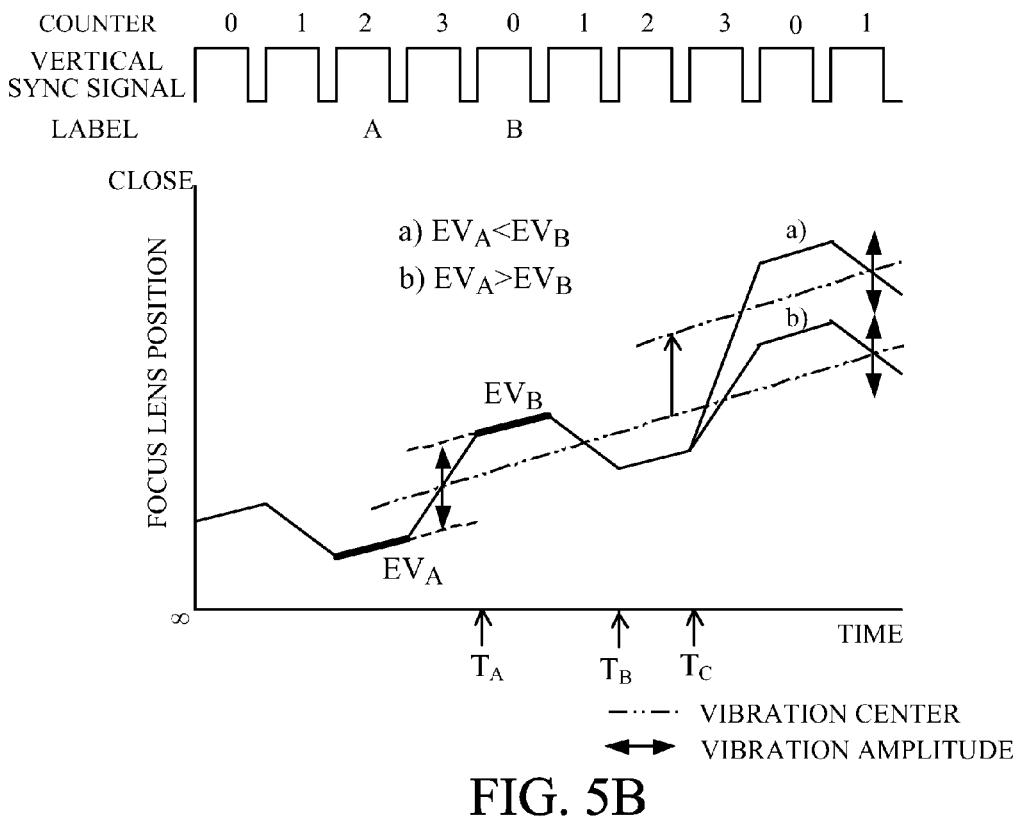
FIG. 5B shows an AF process performed during zooming in the image pickup apparatus of the embodiment.

Thus, as shown in FIG. 5B, in the above-described in-focus cam tracing control during the zoom operation, this embodiment repeatedly updates the vibration center of the minute drive of the focus lens 105 in response to increase and decrease of the AF evaluation value to specify one electronic cam to be traced by the focus lens 105. Such drive control of the focus lens 105 is referred to as "modulation operation" of the focus lens 105.

The upper part of FIG. 5B shows a vertical synchronization signal of the video signal as well as FIG. 5A. In FIG. 5B, a horizontal axis shows time, and a vertical axis shows the focus lens position. In the modulation operation of the focus lens 105 in the zoom operation, the vibration center is located on one in-focus cam to be traced by the focus lens 105 (hereinafter referred to as a "reference cam"), and a gradient of the vibration center is changed depending on the object distance corresponding to the reference cam to be traced and the zoom lens position. FIG. 5B shows a case where the modulation operation is repeatedly performed in a cycle of four vertical synchronization times (4V). The modulation operation includes the following four operation steps.

When a counter of the operation step of the modulation operation is 0, the focus lens 105 is moved so as to keep a relative positional relationship between the position of the focus lens 105 obtained when the counter is 3 and the vibration center. When the counter is 1, a position away from the vibration center to the infinitely-far side by the vibration amplitude is set to a target position, and the focus lens 105 is moved to the target position.

When the counter is 2, the focus lens 105 is moved so as to keep a relative positional relationship between the position of the focus lens 105 obtained when the counter is 1 and the vibration center. When the counter is 3, a position away from the vibration center to the close side by the vibration amplitude is set to a target position, and the focus lens 105 is moved to the target position. The cycle of the modulation operation is not limited to 4V, and may be a cycle corresponding to an integral multiple of 2V, such as 2V and 8V.

As well as FIG. 5A, the AF evaluation value $EV_A$ obtained from the video signal produced by using the electric charges accumulated in the image pickup element 106 during the time period labeled with A is taken into the microcomputer 114 at the time $T_A$. Moreover, the AF evaluation value $EV_B$ obtained from the video signal produced by using the electric charges accumulated in the image pickup element 106 during the time period labeled with B is taken into the microcomputer 114 at the time $T_B$. At the time $T_C$, the microcomputer 114 compares the AF evaluation value $EV_A$ with the AF evaluation value $EV_B$, and moves the vibration center only when $EV_B$ is larger than $EV_A$.

As described above, in the zoom operation, moving the vibration center so as to increase the AF evaluation value by using a combination of the reference cam tracing control based on the in-focus cam data and the modulation operation of the focus lens 105 makes it possible to correctly specify the in-focus cam to be traced. The movement amount of the focus lens 105 here is set based on the depth of focus to a movement amount that generates no visible defocus in the captured image.

Figure 2:
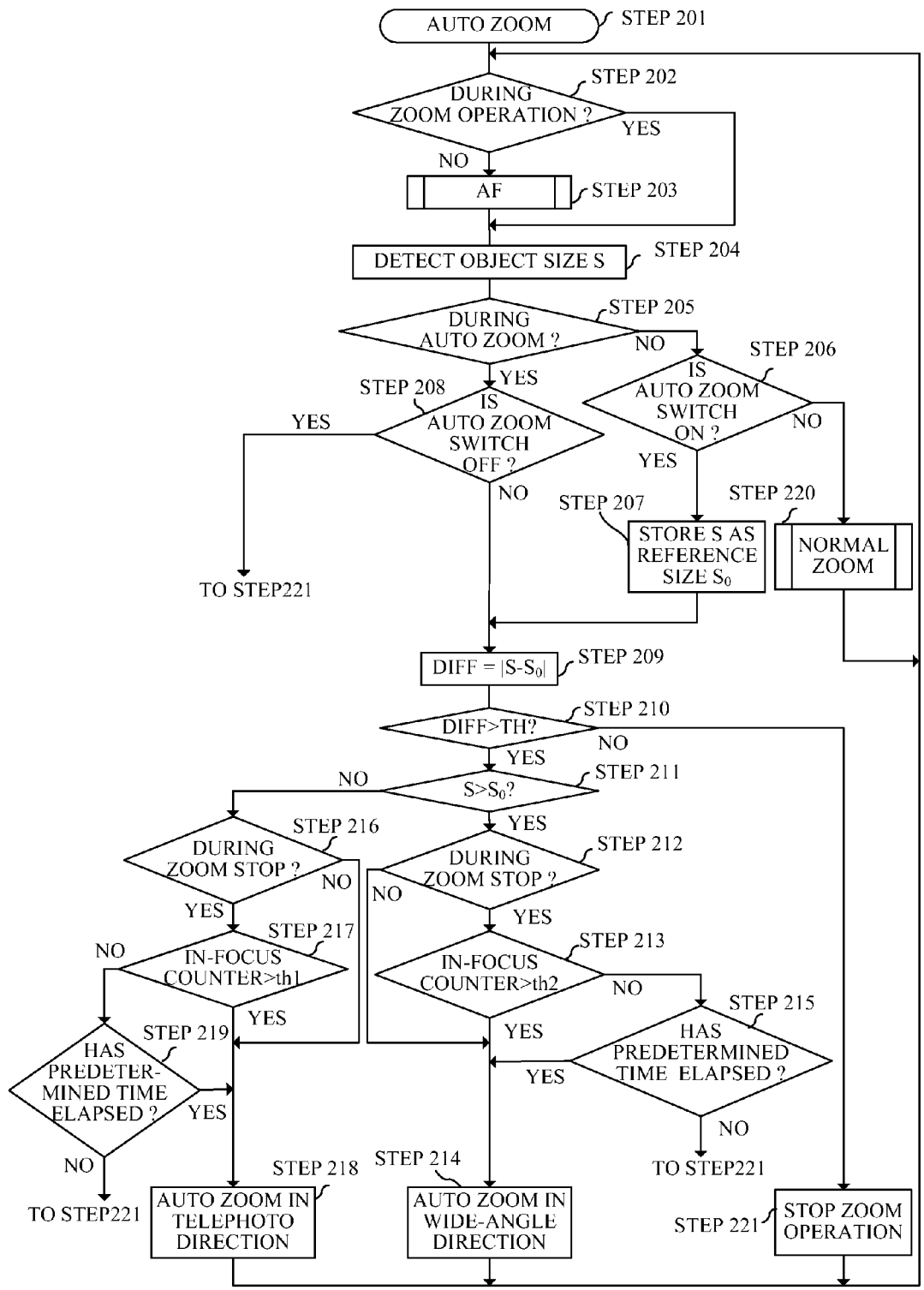
FIG. 2 is a flowchart showing auto zoom control performed in the image pickup apparatus of the embodiment.

Next, a detailed description will be made of the auto zoom performed by the microcomputer 114 with reference to FIG. 2. The auto zoom is also executed according to a computer program stored in the memory 116.

At step 201, the microcomputer 114 starts the process of the auto zoom. At step 202, the microcomputer 114 determines whether or not the zoom operation of the image taking optical system is currently performed. This is to perform the above-described AF control in which the in-focus cam tracing control is combined with the modulation operation in the zoom operation, which is different from a case where the zoom operation is not performed. If the zoom operation is not currently performed, the microcomputer 114 proceeds to step 203. If the zoom operation is currently performed, the microcomputer 114 directly proceeds to step 204.

At step 203, the microcomputer 114 performs the AF control to search for the in-focus position based on the AF evaluation value while moving the focus lens 105.

At step 204, the microcomputer 114 causes the object detection processing part 112 to detect a face, which is the specific object, and stores the size S of the face in the memory 116.

At step 205, the microcomputer 114 determines whether or not the auto zoom is currently performed. If the auto zoom is not currently performed, the microcomputer 114 proceeds to step 206. If the auto zoom is currently performed, the microcomputer 114 proceeds to step 208.

At step 206, the microcomputer 114 determines whether or not the auto zoom switch 115 has been turned ON by a user. If the auto zoom switch 115 has not been turned ON, the microcomputer 114 proceeds to step 220 to perform the normal zoom in response to operations of the zoom keys 118 and 119, and then returns to step 202. On the other hand, if the auto zoom switch 115 has been turned ON, the microcomputer 114 proceeds to step 207 to store the current size S of the face as the reference size $S_0$, which is the target value of the auto zoom, in the memory 116.

At step 208, the microcomputer 114 determines whether or not the auto zoom switch 115 has been turned OFF by the user. If the auto zoom switch 115 has been turned OFF, the microcomputer 114 proceeds to step 221 to stop the zoom operation, and then returns to step 202. On the other hand, if the auto zoom switch 115 has not been turned OFF, the microcomputer 114 proceeds to step 209.

At step 209, the microcomputer 114 stores an absolute value of a difference between the current size S of the face and the reference size $S_0$ as a variable DIFF. Then, the microcomputer 114 proceeds to step 210 to determine whether or not the variable DIFF is larger than a predetermined value (hereinafter referred to as a "threshold") TH. The threshold TH is provided for preventing the zoom lens 102 being continuously and minutely moved by the auto zoom when the size S of the object is minutely changed due to detection errors in the object detection processing part 112 or the like. That is, the threshold TH is provided for allowing the auto zoom to be activated when the difference between the current size S of the object and the reference size $S_0$ increases to some extent.

The threshold TH may be a fixed value, and may be defined as a ratio to the size S of the object, such as 10% of the size S. Moreover, the threshold TH may be changed depending on a zoom magnification.

If determining at step 210 that the variable DIFF, which is the difference between the current size S of the face and the reference size $S_0$, is smaller than the threshold TH, the microcomputer 114 proceeds to step 221 to stop the zoom operation, and then returns to step 202.

On the other hand, if determining that the difference (variable) DIFF is larger than the threshold TH, the microcomputer 114 proceeds to step 211 to determine whether or not the current size S of the face is larger than the reference size $S_0$. If the current size S is larger than the reference size $S_0$, the microcomputer 114 proceeds to step 212 to determine whether or not the zoom operation in the auto zoom is currently stopped. If the zoom operation is currently stopped, the microcomputer 114 proceeds to step 213. If the zoom operation is not currently stopped, the microcomputer 114 proceeds to step 214.

At step 213, the microcomputer 114 determines whether or not the in-focus counter is larger than a predetermined value th2, in other words, whether or not an in-focus state has been obtained. If determining that the in-focus counter is larger than the predetermined value th2 (that is, the in-focus determination is made) while the zoom operation is stopped, the microcomputer 114 proceeds to step 214 to start the zoom operation in the auto zoom in the wide-angle direction, and then returns to step 202. In other words, this embodiment restricts, as a general rule, the zoom operation in the auto zoom until the in-focus determination is made in the AF, and releases the restriction of the zoom operation in the auto zoom, that is, allows start thereof in response to the in-focus determination.

Although this embodiment describes the case where the restriction of the zoom operation restricts the start of the zoom operation to disable the entire zoom operation, the restriction of the zoom operation is not limited thereto. For example, the restriction of the zoom operation may include restriction of a lens movable range for the zoom operation and restriction a lens movement speed in the zoom operation. In these cases, until the in-focus determination is made, the lens movable range may be set to be narrower and the lens movement speed may be set to be slower than those before the restriction is made.

On the other hand, when directly proceeding to step 214 due to a determination that the zoom operation in the auto zoom is not currently stopped at step 212, the microcomputer 114 continues the auto zoom in the wide-angle direction.

Moreover, if determining that the in-focus counter is smaller than the predetermined value th2 at step 213 (that is, the in-focus determination cannot be made), the microcomputer 114 proceeds to step 215 to determine whether or not that situation has continued for a predetermined time. If an in-focus state is not obtained even though the predetermined time has elapsed, since the object may be an object on which no in-focus state can be obtained, the microcomputer 114 proceeds to step 214 to start the zoom operation in the auto zoom in the wide-angle direction. If the situation where the in-focus determination cannot be made has not yet continued for the predetermined time, the microcomputer 114 proceeds to step 221 to keep the zoom operation stopped.

Thus, this embodiment releases, as an exception to the general rule, the restriction of the zoom operation in the auto zoom in the wide-angle direction, that is, allows the start thereof, when that restriction has continued for more than the predetermined time, even though no in-focus determination is made.

On the other hand, if determining that the current size S is smaller than the reference size $S_0$ at step 211, the microcomputer 114 proceeds to step 216 to determine whether or not the zoom operation in the auto zoom is currently stopped. If determining that the zoom operation in the auto zoom is currently stopped, the microcomputer 114 proceeds to step 217 to determine whether or not the in-focus counter is larger than a predetermined value th1, in other words, whether or not an in-focus state has been obtained. Then, if determining that the in-focus counter is larger than the predetermined value th1 (that is, the in-focus determination is made) while the zoom operation is currently stopped, the microcomputer 114 proceeds to step 218 to start the zoom operation in the auto zoom in the telephoto direction, and then returns to step 202. In other words, as well as in the above-described auto zoom in the wide-angle direction, also in the auto zoom in the telephoto direction, as a general rule, this embodiment restricts the zoom operation until the in-focus determination is made in the AF, and releases the restriction of the zoom operation, that is, allows start thereof in response to the in-focus determination.

When directly proceeding to step 218 due to a determination that the zoom operation in the auto zoom is not currently stopped at step 216, the microcomputer 114 continues the auto zoom in the telephoto direction.

Moreover, if determining that the in-focus counter is smaller than the predetermined value th1 (that is, the in-focus determination cannot be made) at step 217, the microcomputer 114 proceeds to step 219 to determine whether or not that situation has continued for the predetermined time. If the in-focus state is not obtained even though the predetermined time has elapsed, since the object may be an object on which no in-focus state can be obtained, the microcomputer 114 proceeds to step 218 to start the zoom operation in the auto zoom in the telephoto direction. If the situation where the in-focus determination cannot be made has not yet continued for the predetermined time, the microcomputer 114 proceeds to step 221 to keep the zoom operation stopped.

Thus, also in the auto zoom in the telephoto direction, this embodiment releases, as an exception to the general rule, the restriction of the zoom operation, that is, allows the start thereof when that restriction has continued for more than the predetermined time, even though no in-focus determination is made.

Next, description will be made of the relationship between the predetermined values th1 and th2. In the inner focus type zoom lens unit, even though an in-focus state is not obtained on the telephoto side, a zoom operation to the wide-angle side brings the zoom lens unit into a near in-focus state. Therefore, this embodiment sets the predetermined value th2 that is a threshold for the in-focus determination in the wide-angle direction to a small value or 0 so as to allow the zoom operation in the auto zoom even if a certain in-focus state may not be actually obtained. On the other hand, this embodiment sets the predetermined value th1 that is a threshold for the in-focus determination in the telephoto direction to a value larger than the predetermined value th2 so as to allow the zoom operation in the auto zoom after a certain in-focus state is obtained in order to enable maintaining of the in-focus state during the auto zoom. Thus, the predetermined values th1 and th2 satisfy the following relationship:

$$th2 < th1.$$

In particular, in a case where the predetermined value th2 is set to 0, the in-focus determination is made when the zoom operation is performed on the telephoto side, but the in-focus determination is not substantially made when the zoom operation is performed on the wide-angle side. This case corresponding to a case where steps 212, 213 and 215 are omitted from the flowchart shown in FIG. 2.

Setting the predetermined value th2 to a small value makes it possible to prevent the start of the zoom operation in the auto zoom from being delayed more than necessary.

The above-described auto zoom performs the zoom operation so as to make the size of the specific object equal or closer to the reference size (target value). The size close (closer) to the reference size means that, for example, the size is included within a range having a slight difference from the reference size.

Figure 10:
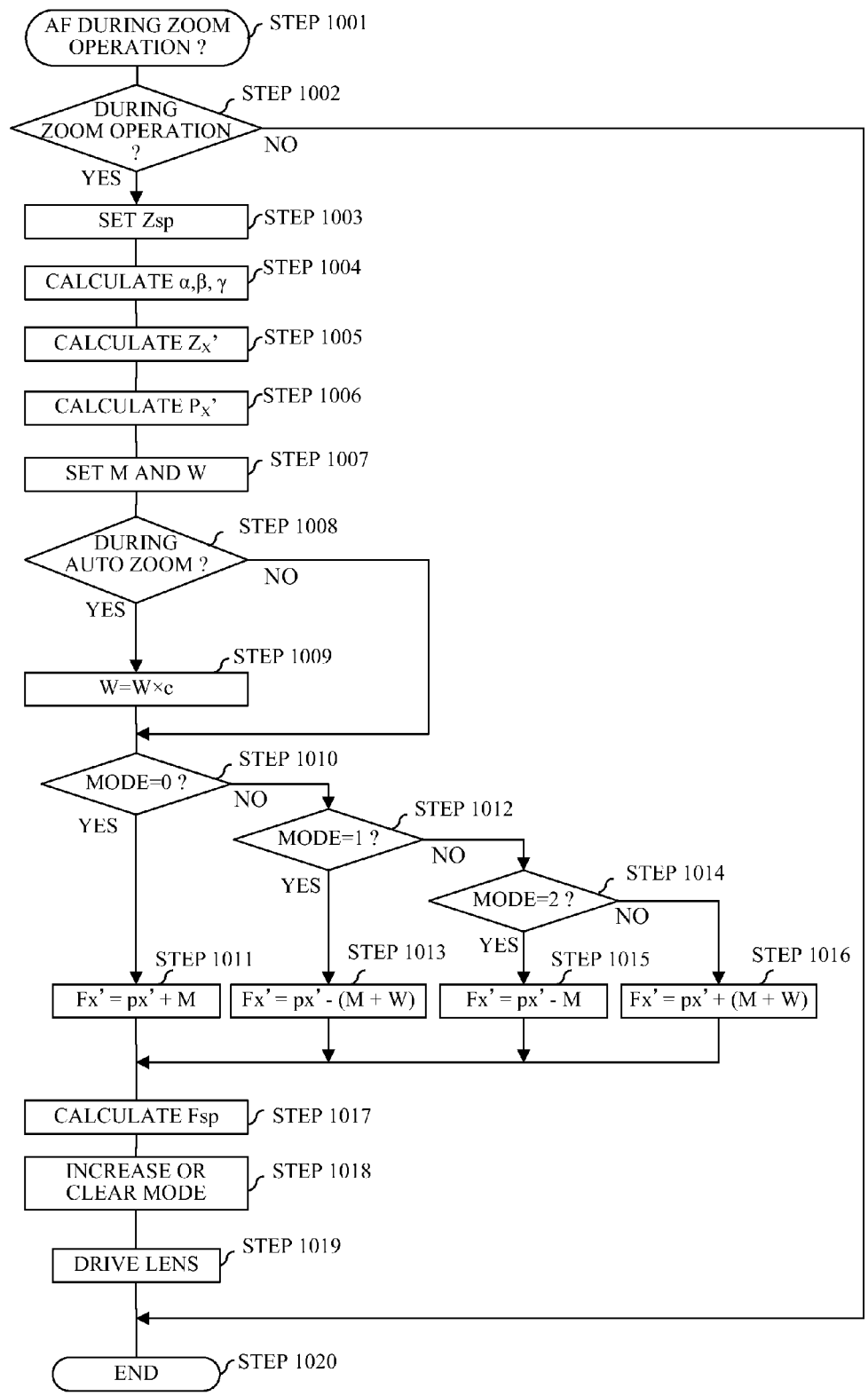
FIG. 10 is a flowchart showing AF control during zooming performed in the image pickup apparatus of the embodiment.

Next, description will be made of an AF process performed during the zoom operation by the microcomputer 114 with reference to a flowchart shown in FIG. 10. This AF process is executed at steps 214 and 218 in the flowchart shown in FIG. 2.

At step 1001, the microcomputer 114 starts the process of the AF. At step 1002, the microcomputer 114 determines whether or not the zoom operation is currently performed. If the zoom operation is currently performed, the microcomputer 114 proceeds to step 1003. If the zoom operation is not currently performed, the microcomputer 114 proceeds to step 1023 to end this process.

At step 1003, the microcomputer 114 sets a drive speed Zsp of the zoom motor 110, and then proceeds to step 1004.

Figure 11:
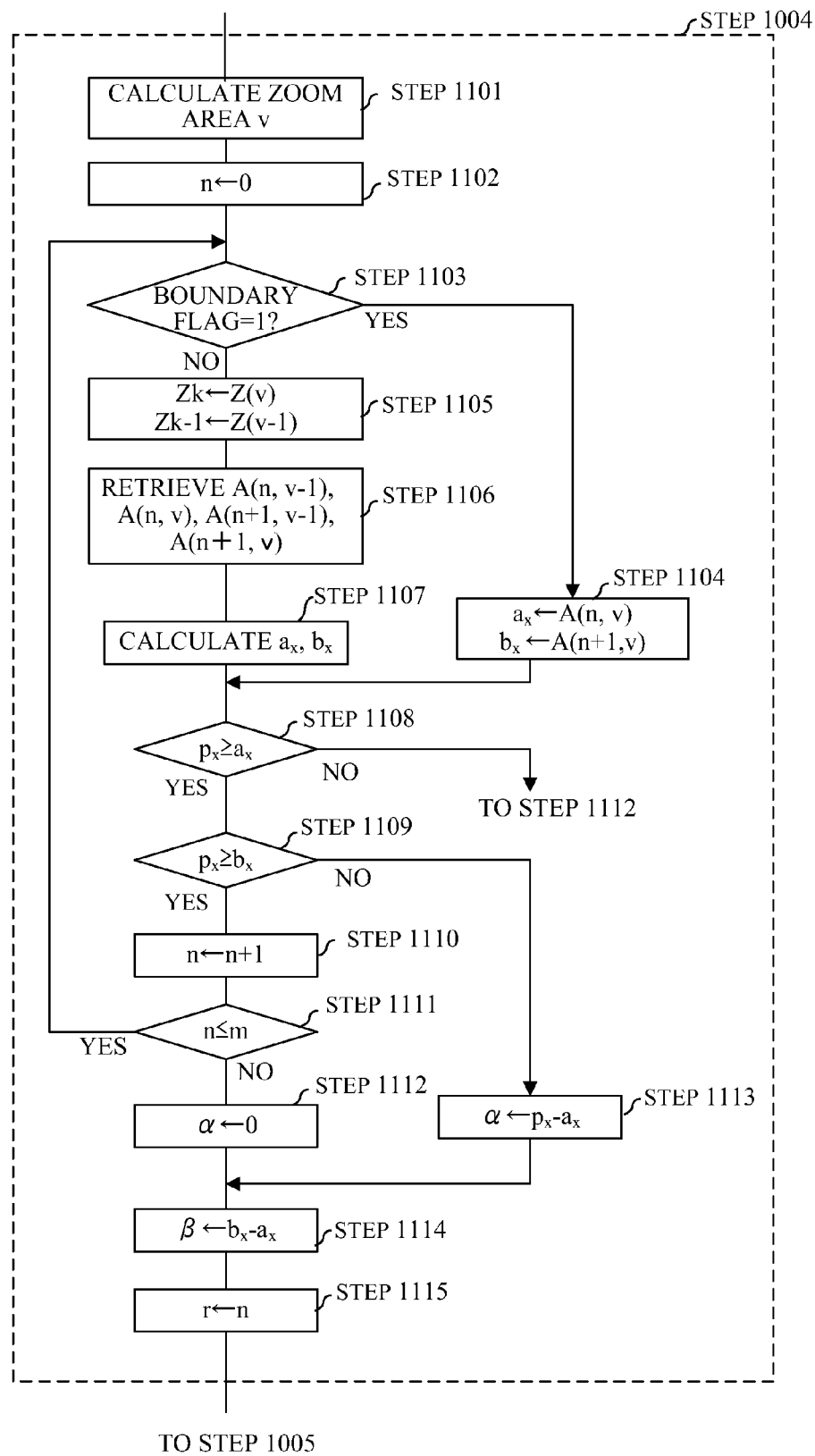
FIG. 11 is a flowchart of a process for calculating cam parameters in the image pickup apparatus of the embodiment.

At step 1004, the microcomputer 114 estimates a distance to an object (object distance) whose image is to be captured, from the current positions of the zoom lens 102 and the focus lens 105. Then, the microcomputer 114 stores information on the object distance in a memory area such as a RAM, as three cam parameters (data for obtaining a target position) α, β and γ. At this step, a process shown in FIG. 11 is performed. In order for simplification, description of the process shown in FIG. 11 will be made as if an in-focus state is maintained at the current zoom and focus lens positions.

At step 1101 in FIG. 11, the microcomputer 114 calculates which zoom area (v) among plural (s) zoom areas on the table data shown in FIG. 8C the current zoom position $Z_x$ is included in. The plural zoom areas are formed by equally dividing an entire zoom range from the wide-angle end to the telephoto end into s segments. The calculation method will be described with reference to FIG. 12.

Figure 12:
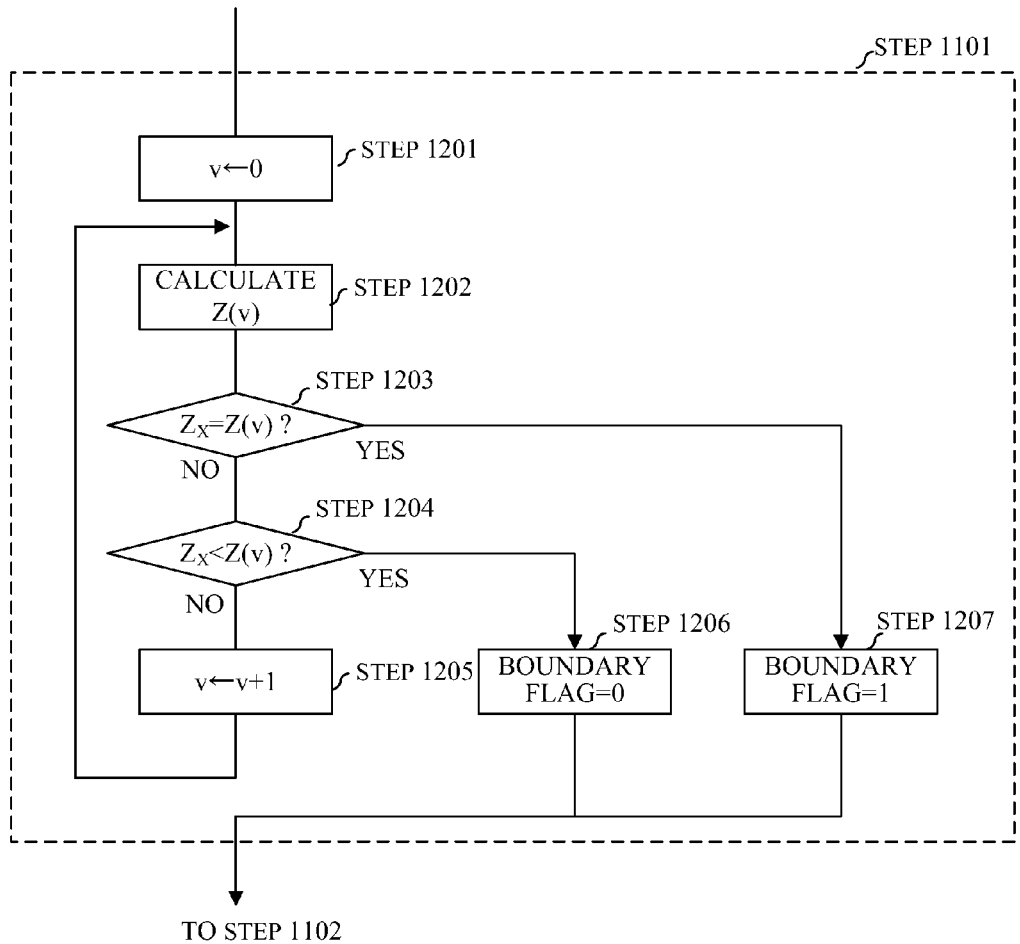
FIG. 12 is a flowchart showing a method of calculating a zoom area in the image pickup apparatus of the embodiment.

At step 1201 in FIG. 12, the microcomputer 114 clears a zoom area variable v. At step 1202, the microcomputer 114 calculates a zoom lens position Z(v) on the boundary of the zoom area v according to the following expression (4). This Z(v) corresponds to the zoom lens positions $Z_0, Z_1, Z_2, \ldots$, shown in FIG. 8A.

$$Z(v)=(D-E)\times v/s+E \qquad (4)$$

where D represents the zoom lens position at the telephoto end, and E represents the zoom lens position at the wide-angle end.

At step 1203, the microcomputer 114 determines whether or not Z(v) calculated at step 1202 is equal to the current zoom lens position $Z_x$. If Z(v) is equal to the current zoom lens position $Z_x$, the microcomputer 114 proceeds to step 1207 to regard that the current zoom lens position $Z_x$ is located on the boundary of the zoom area v, and therefore to set 1 to a boundary flag. Then, the microcomputer 114 proceeds to step 1102 shown in FIG. 11.

On the other hand, if Z(v) is not equal to the current zoom lens position $Z_x$ at step 1203, the microcomputer 114 proceeds to step 1204 to determine whether or not $Z_x<Z(v)$, that is, whether or not the current zoom lens position $Z_x$ is closer to the wide-angle end than the zoom area Z(v). If $Z_x<Z(v)$, the microcomputer 114 proceeds to step 1206 to regard that the current zoom lens position $Z_x$ is located between Z(v−1) and Z(v), and therefore to set 0 to the boundary flag. Then, the microcomputer 114 proceeds to step 1102 shown in FIG. 11. If not $Z_x<Z(v)$, the microcomputer 114 proceeds to step 1205 to shift the zoom area v by +1, and then returns to step 1202.

Repeating the process of FIG. 12 can provide, at the time of completing the repeated processes, information on whether or not the current zoom lens position $Z_x$ is included in the v(=k)-th zoom area (hereinafter referred to as a "current zoom area") on the data table shown in FIG. 8C and information on whether or not $Z_x$ is located on the boundary of the zoom area.

Returning to the flowchart shown in FIG. 11, since the current zoom area has been determined by the process shown in FIG. 12 at step 1101, the microcomputer 114 calculates which focus area among plural focus areas on the table data shown in FIG. 8C the current focus position is included in.

First at step 1102, the microcomputer 114 clears an object distance variable n. Next at step 1103, the microcomputer 114 determines whether or not the current zoom lens position is located on the boundary of the zoom area, that is, whether or not the boundary flag is set to 1. If the boundary flag is 0, the microcomputer 114 regards that the current zoom lens position is not located on the boundary to proceed to processes from step 1105. If the boundary flag is 1, the microcomputer 114 regards that the current zoom lens position is located on the boundary to proceed to processes from step 1104.

At step 1105, the microcomputer 114 sets Z(v) to $Z_k$ and sets Z(v−1) to $Z_{k-1}$. Next, at step 1106, the microcomputer 114 retrieves, from the table data shown in FIG. 8C, four in-focus position data A(n,v−1), A(n,v), A(n+1,v−1) and A(n+1,v). Then, at step 1107, the microcomputer 114 calculates $a_x$ and $b_x$ by using the above-described expressions (2) and (3).

On the other hand, at step 1104, the microcomputer 114 retrieves, from the table data, two in-focus position data A(n, v) and A(n+1,v) for the zoom lens position v at the object distances n and n+1. Then, the microcomputer 114 stores A(n,v) and A(n+1,v) as $a_x$ and $b_x$, respectively.

At step 1108, the microcomputer 114 determines whether or not the current focus lens position $p_x$ is equal to or greater than $a_x$, that is, whether or not the current focus lens position $p_x$ is equal or closer to a close end than $a_x$. If $p_x$ is equal to or greater than $a_x$, the microcomputer 114 proceeds to step 1109 to determine whether or not the current focus lens position $p_x$ is equal to or greater than $b_x$, that is, whether or not the current focus lens position $p_x$ is equal or closer to the close end than $b_x$. If $p_x$ is not equal to or greater than $b_x$, that is, the current focus lens position $p_x$ is located between the in-focus positions corresponding to the object distances n and n+1, the microcomputer 114 stores the cam parameters for this situation in the memory area at steps 1113 to 1115. Specifically, the microcomputer 114 sets α=$p_x$−$a_x$ at step 1113, sets β=$b_x$−$a_x$ at step 1114, and sets γ=n at step 1115. Then, the microcomputer 114 proceeds from step 1115 to step 1005 shown in FIG. 10.

If determining that $p_x$ is not equal to or greater than $a_x$ at step 1108, the current focus lens position $p_x$ is located at a position exceeding an infinitely-far end. In this case, the microcomputer 114 proceeds to step 1112 to set α=0, and then proceeds to processes from step 1114 to store the cam parameters for the infinitely-far end.

If determining that $p_x$ is equal to or greater than $b_x$ at step 1109, the current focus lens position $p_x$ is located further on the close side than $b_x$. In this case, the microcomputer 114 proceeds to step 1110 to increase the object distance n by 1, and then proceeds to step 1111 to determine whether or not the object distance n is further on the infinitely-far side than a closest object distance m. If the object distance n is further on the infinitely-far side than the closest object distance m, the microcomputer 114 returns to step 1103. If the object distance n is not further on the infinitely-far side than the closest object distance m, the current focus lens position $p_x$ is located at a position exceeding the close end. In this case, the microcomputer 114 proceeds to step 1112 to store the cam parameters for the close end. Specifically, the microcomputer 114 sets α=0 at step 1112, sets β=$b_x$−$a_x$ at step 1114, and sets γ=n at step 1115. Then, the microcomputer 114 proceeds from step 1115 to step 1005 shown in FIG. 10.

Returning to FIG. 10, as described above, the microcomputer 114 at step 1004 stored the cam parameters showing which in-focus cam among the plural in-focus cams shown in FIG. 9 the current zoom lens position and the current focus lens position are located on. Next at step 1005, the microcomputer 114 calculates a position $Z_x'$ that is a destination position at which the zoom lens 102 will arrive from the current position $Z_x$ after one vertical synchronization time (1V). Then, the microcomputer 114 proceeds to step 1006.

When the zoom speed decided at step 1003 is denoted by Zsp (pps), the zoom lens position Zx' after 1V is given by the following expression (5). In the expression (5), pps represents a unit showing a rotational speed of a stepping motor as the zoom motor 110, which shows a rotation step amount per one second (one step corresponds to one pulse). Moreover, signs (+ and −) in the expression (5) indicate the movement direction of the zoom lens 102, + indicating the telephoto direction and − indicating the wide-angle direction, $$Z_x'=Z_x\pm Zsp/\text{vertical synchronization frequency.} \quad (5)$$

Next, at step 1006, the microcomputer 114 calculates a focus lens position $p_x'$ on the reference cam for the zoom lens position $Z_x'$ from the cam parameters α, β and γ stored at step 1004 and from the in-focus position data (table data). Then, the microcomputer 114 proceeds to step 1007. Description will hereinafter be made of the calculation of the focus lens position $p_x'$ with reference to FIG. 13.

Figure 13:
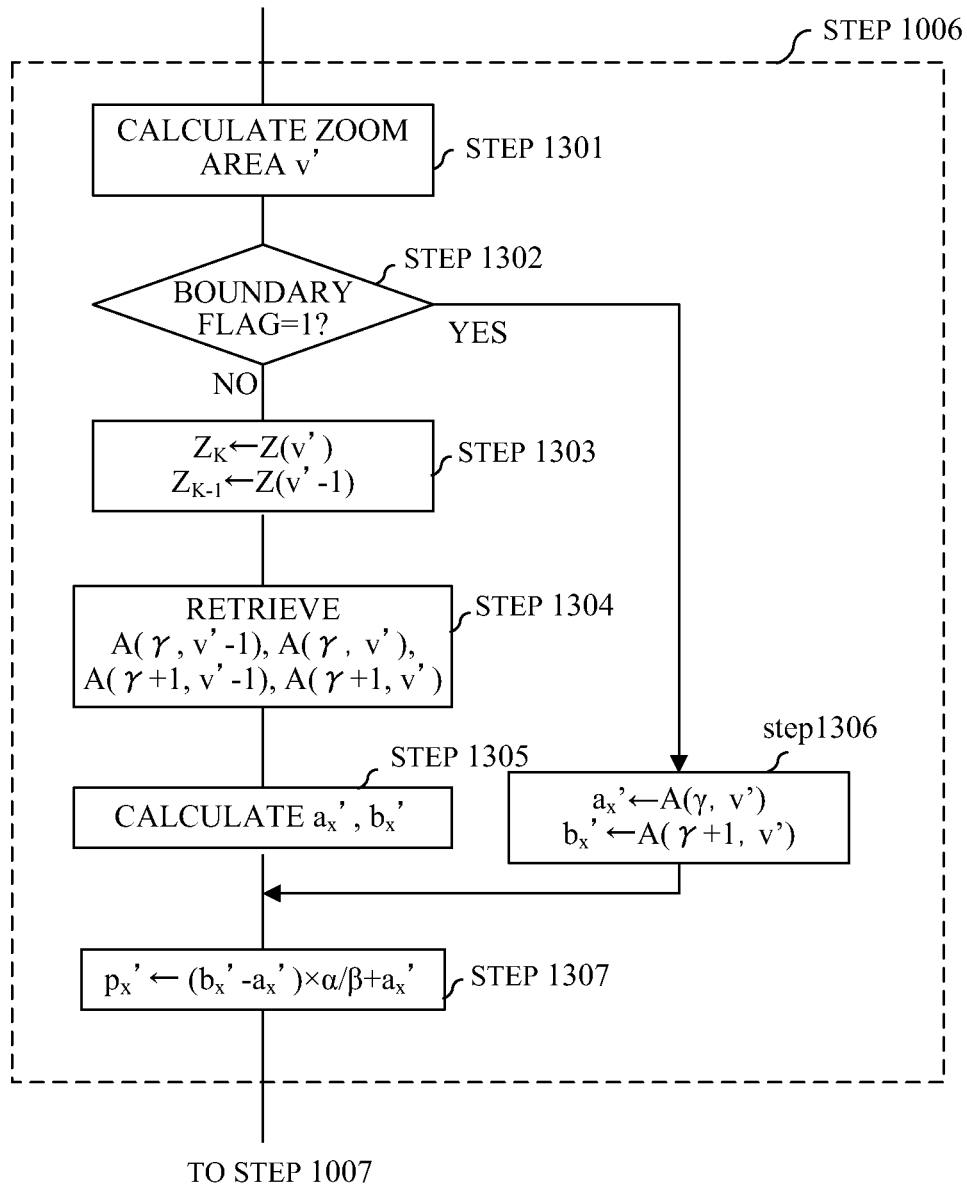
FIG. 13 is a flowchart showing a process for calculating a focus lens position on a reference cam corresponding to a zoom lens position in the image pickup apparatus of the embodiment.

At step 1301 of FIG. 13, the microcomputer 114 calculates which zoom area v' the zoom lens position $Z_x'$ is included in. At step 1301, the microcomputer 114 performs processes similar to those shown in FIG. 12. Specifically, the microcomputer 114 performs the processes shown in FIG. 11 using $Z_x'$ instead of $Z_x$ and using v' instead of v.

Next at step 1302, the microcomputer 114 determines whether or not the zoom lens position $Z_x'$ after 1V is located on the boundary of the zoom area, in other words, whether or not the boundary flag is set to 1. If the boundary flag is set to 0, the microcomputer 114 regards that the zoom lens position $Z_x'$ is not located on the boundary to proceed to process from step 1303. If the boundary flag is set to 1, the microcomputer 114 regards that the zoom lens position $Z_{40}'$ is located on the boundary to proceed to step 1306.

At step 1303, the microcomputer 114 performs setting of $Z_k$ and $Z_{k-1}$ as follows:

$$Z_k \leftarrow Z(v')$$

$$Z_{k-1} \leftarrow Z(v'-1).$$

Next, at step 1304, the microcomputer 114 retrieves from the data table shown in FIG. 8C four in-focus position data A(γ,v'−1), A(γ,v'), A(γ+1,v'−1) and A(γ+1,v') in which the object distance γ is specified by the process shown in FIG. 11. Then, at step 1305, the microcomputer 114 calculates $a_x'$ and $b_x'$ by using the above-described expressions (2) and (3). The microcomputer 114 thereafter proceeds to step 1307.

On the other hand, at step 1306, the microcomputer 114 retrieves from the data table two in-focus position data A(γ,v') and A(γ+1,v') for the object distances γ and γ+1 in the zoom area v', and then stores A(γ,v') and A(γ+1,v') in the memory area as $a_x'$ and $b_x'$, respectively.

At step 1307, the microcomputer 114 calculates an in-focus position (target focus lens position) $p_x'$ of the focus lens 105 for the zoom lens position $Z_x'$ after 1V. By using the expression (1), the target focus lens position $p_x'$ after 1V can be expressed as the following expression (6):

$$p_x' = (b_x' - a_x') \times \alpha/\beta + a_x'. \qquad (6)$$

Accordingly, a difference ΔF between the target focus lens position $p_x'$ and the current focus lens position $p_x$ is shown by the following expression:

$$\Delta F = (b_x' - a_x') \times \alpha/\beta + a_x' - p_x.$$

A drive speed of the focus lens 105 can be obtained by dividing the focus lens position difference ΔF by a movement time of the zoom lens 102 required to be moved by a distance corresponding to ΔF. When the zoom lens 102 is driven from the wide-angle side to the telephoto side at a fixed (constant) speed, the drive speed of the focus lens 105 can be regarded as same as a gradient of the cam shown in FIG. 9. Therefore, the drive speed of the focus lens 105 increases as the zoom lens position becomes closer to the telephoto end and as the object distance becomes closer to an infinitely far distance.

Returning to FIG. 10, at step 1007, the microcomputer 114 sets the vibration amplitude M and the center movement amplitude W in the above-described modulation operation, on the basis of information on the depth of focus at the zoom lens position $Z_x'$ and the like. Then, the microcomputer 114 proceeds to step 1008.

At step 1008, the microcomputer 114 determines whether or not the auto zoom is currently performed. If the auto zoom is currently performed, the microcomputer 114 proceeds to step 1009. If the auto zoom is not currently performed, the microcomputer 114 proceeds to step 1010.

At step 1009, the microcomputer 114 multiplies the center movement amplitude W by a coefficient c smaller than 1 to decrease the center movement amplitude W, in order to stably perform the AF control in the zoom operation with a small center movement amplitude W. Then, the microcomputer 114 proceeds to step 1010.

At step 1010, the microcomputer 114 determines whether or not a current mode of the modulation operation is 0. If the mode is 0, the microcomputer 114 proceeds to step 1011. If the mode is not 0, the microcomputer 114 proceeds to step 1012.

At step 1011, the microcomputer 114 sets a drive target position $F_x'$ of the focus lens 105 after 1V as follows so as to keep a relative positional relationship between the current focus lens position and the reference cam, $$F_x' = p_x' + M.$$

At step 1012, the microcomputer 114 determines whether or not the current mode of the modulation operation is 1. If the mode is 1, the microcomputer 114 proceeds to step 1013. If the mode is not 1, the microcomputer 114 proceeds to step 1014.

At step 1013, the microcomputer 114 sets the drive target position $F_x'$ of the focus lens 105 after 1V as follows such that a position where the modulation amplitude (drive amplitude) (M+W) is superimposed on $p_x'$ in the infinitely-far direction becomes the drive target position $F_x'$, $$F_x' = p_x' - (M+W).$$

At step 1014, the microcomputer 114 determines whether or not the current mode of the modulation operation is 2. If the mode is 2, the microcomputer 114 proceeds to step 1015. If the mode is not 2, the microcomputer 114 proceeds to step 1016.

At step 1015, the microcomputer 114 sets the drive target position $F_x'$ of the focus lens 105 after 1V as follows so as to keep the relative positional relationship between the current focus lens position and the reference cam, $$F_x' = p_x' - M.$$

At step 1016, the microcomputer 114 sets the drive target position $F_x'$ of the focus lens 105 after 1V as follows such that a position where the modulation amplitude (M+W) is superimposed on $p_x'$ in the close direction becomes the drive target position $F_x'$, $$F_x' = p_x' + (M+W).$$

At step 1017, the microcomputer 114 calculates the drive speed (focus drive speed) Fsp when moving the focus lens 105 to the drive target position $F_x'$ set at step 1011, 1013, 1015 or 1016. The focus drive speed Fsp can be obtained by dividing a difference between the drive target position $F_x'$ on which the modulation amplitude (M+W) has been superimposed and the current focus lens position $p_x$ by a movement time of the zoom lens 102 required to be moved by a distance corresponding to the above positional difference.

This embodiment sets the movement time of the zoom lens 102 to a same time as one vertical synchronization time because this embodiment also moves the zoom lens 102 in synchronization with the vertical synchronization time. In other words, the focus drive speed Fsp is calculated by the following expression:

$$Fsp = |F_x' - p_x|/\text{one vertical synchronization time}.$$

At step 1018, the microcomputer 114 shifts the mode to 0 if the current mode is 3 or increases the mode by 1 if the current mode is not 3, and then proceeds to step 1019.

At step 1019, the microcomputer 114 produces driving signals on the basis of the target positions and the drive speeds of the zoom lens 102 and the focus lens 105 calculated in the above-described processes, and controls the zoom motor 110 and the focus motor 111 by supplying the driving signals thereto to move the zoom lens 102 and the focus lens 105. Then, the microcomputer 114 proceeds to step 1020 to end the process.

Thus, in the auto zoom that is started after the in-focus determination is made, the center movement amplitude W is set to be smaller than that in the normal zoom. That is, the focus drive speed in the image taking optical system during the auto zoom is made to be slower than that during the normal zoom. This speed setting can prevent the focus lens 105 from significantly deviating from the in-focus cam even if the focus lens 105 is moved in a wrong direction by the autofocus.

The above-described embodiment waits for the in-focus determination before the start of the zoom operation in the auto zoom, which makes it easy to obtain and maintain an in-focus state during the zoom operation in the auto zoom. Therefore, generation of defocus during the zoom operation in the auto zoom can be prevented.

Moreover, the above-described embodiment changes the condition for the in-focus determination (that is, the condition for determining whether or not the in-focus state has been obtained) depending on the zoom direction, which can prevent the zoom operation in the auto zoom from becoming slow due to needless waiting for the in-focus determination.

Although the above embodiment described the case of performing the auto zoom by using the optical zoom operation, the auto zoom may be performed by electronic zoom operation that enlarges part of the captured image. Moreover, the auto zoom may be performed by a combination of the optical zoom operation and the electronic zoom operation. In other words, embodiments of the present invention include image pickup apparatuses capable of performing at least one of the optical zoom operation and the electronic zoom operation.

In addition, although the above embodiment described the image pickup apparatus integrally provided with the image taking optical system, alternative embodiments of the present invention include an image pickup apparatus in which the image taking optical system is interchangeable.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-134079, filed on Jun. 11, 2010, which is hereby incorporated by reference herein in its entirety.

What is claimed is:

1. An image pickup apparatus comprising:
   an image pickup unit configured to photoelectrically convert an object image formed by an image taking optical system;
   an image production unit configured to produce an image by using an output signal from the image pickup unit;
   a size detection unit configured to detect a size of a specific object in the image;
   a storage unit configured to store a target value of the size of the specific object;
   a zoom control unit configured to perform auto zoom control that automatically provides a specific zoom operation to make the size of the specific object equal or closer to the target value; and
   a focus control unit configured to perform focus control of the image taking optical system based on a contrast evaluation value obtained from the image,
   wherein the zoom control unit is configured to restrict the specific zoom operation in the auto zoom control until a determination is made that an in-focus state of the image taking optical system has been obtained by the focus control.

2. An image pickup apparatus according to claim 1, wherein the focus control unit is configured to change a condition for determining that the in-focus state has been obtained, depending on a direction of the specific zoom operation in the auto zoom control.

3. An image pickup apparatus according to claim 1, wherein the zoom control unit is configured to release the restriction of the specific zoom operation in the auto zoom control when the restriction of the specific zoom operation has been continuously made for a longer time than a predetermined time.

4. An image pickup apparatus according to claim 1, further comprising:
   a zoom instruction unit configured to be operated by a user to output a zoom instruction signal,
   wherein the zoom control unit is configured to perform normal zoom control that provides a normal zoom operation in response to the zoom instruction signal, and
   wherein the focus control unit is configured to set a focus drive speed during the auto zoom control slower than that during the normal zoom control.

5. An image pickup apparatus comprising:
   an image pickup unit configured to photoelectrically convert an object image formed by an image taking optical system;
   an image production unit configured to produce an image by using an output signal from the image pickup unit;
   a size detection unit configured to detect a size of a specific object in the image;
   a storage unit configured to store a target value of the size of the specific object;
   a zoom control unit configured to perform auto zoom control that automatically provides a specific zoom operation to make the size of the specific object equal or closer to the target value; and
   a focus control unit configured to perform focus control of the image taking optical system based on a contrast evaluation value obtained from the image,
   wherein the zoom control unit is configured to provide the specific zoom operation in the auto zoom control in response to a determination that an in-focus state of the image taking optical system has been obtained by the focus control.

6. An image pickup apparatus according to claim 5, wherein the focus control unit is configured to change a condition for determining that the in-focus state has been obtained, depending on a direction of the specific zoom operation in the auto zoom control.

7. An image pickup apparatus according to claim 5, wherein the zoom control unit is configured to release the restriction of the specific zoom operation in the auto zoom control when the restriction of the specific zoom operation has been continuously made for a longer time than a predetermined time.

8. An image pickup apparatus according to claim 5, further comprising:
   a zoom instruction unit configured to be operated by a user to output a zoom instruction signal,
   wherein the zoom control unit is configured to perform normal zoom control that provides a normal zoom operation in response to the zoom instruction signal, and
   wherein the focus control unit is configured to set a focus drive speed during the auto zoom control slower than that during the normal zoom control.

9. An image pickup apparatus comprising:
   an image pickup unit configured to photoelectrically convert an object image formed by an image taking optical system;
   an image production unit configured to produce an image by using an output signal from the image pickup unit;
   a size detection unit configured to detect a size of a specific object in the image;
   a storage unit configured to store a target value of the size of the specific object;
   a zoom control unit configured to perform auto zoom control that automatically provides a specific zoom operation to make the size of the specific object equal or closer to the target value; and
   a focus control unit configured to perform focus control of the image taking optical system based on a contrast evaluation value obtained from the image,
   wherein, in the auto zoom control, the focus control unit is configured to make a determination of whether or not an in-focus state has been obtained by the focus control before the specific zoom operation.

10. An image pickup apparatus according to claim 9, wherein the focus control unit is configured to change a condition for determining that the in-focus state has been obtained, depending on a direction of the specific zoom operation in the auto zoom control.

11. An image pickup apparatus according to claim 9, wherein the zoom control unit is configured to release the restriction of the specific zoom operation in the auto zoom control when the restriction of the specific zoom operation has been continuously made for a longer time than a predetermined time.

12. An image pickup apparatus according to claim 9, further comprising:
a zoom instruction unit configured to be operated by a user to output a zoom instruction signal,
wherein the zoom control unit is configured to perform normal zoom control that provides a normal zoom operation in response to the zoom instruction signal, and
wherein the focus control unit is configured to set a focus drive speed during the auto zoom control slower than that during the normal zoom control.

13. A method for controlling an image pickup apparatus including an image pickup unit configured to photoelectrically convert an object image formed by an image taking optical system and an image production unit configured to produce an image by using an output signal from the image pickup unit, the method comprising:
a size detection step of detecting a size of a specific object in the image;
a storage step of storing a target value of the size of the specific object to a storage unit;
a zoom control step of performing auto zoom control that automatically provides a specific zoom operation to make the size of the specific object equal or closer to the target value; and
a focus control step of performing focus control of the image taking optical system based on a contrast evaluation value obtained from the image,
wherein, in the zoom control step, in the auto zoom control, the specific zoom operation is restricted until a determination is made that an in-focus state of the image taking optical system has been obtained by the focus control.

14. A method for controlling an image pickup apparatus including an image pickup unit configured to photoelectrically convert an object image formed by an image taking optical system and an image production unit configured to produce an image by using an output signal from the image pickup unit, the method comprising:
a size detection step of detecting a size of a specific object in the image;
a storage step of storing a target value of the size of the specific object to a storage unit;
a zoom control step of performing auto zoom control that automatically provides a specific zoom operation to make the size of the specific object equal or closer to the target value; and
a focus control step of performing focus control of the image taking optical system based on a contrast evaluation value obtained from the image,
wherein, in the zoom control step, in the auto zoom control, the specific zoom operation is provided in response to a determination that an in-focus state of the image taking optical system has been obtained by the focus control.

15. A method for controlling an image pickup apparatus including an image pickup unit configured to photoelectrically convert an object image formed by an image taking optical system and an image production unit configured to produce an image by using an output signal from the image pickup unit, the method comprising:
a size detection step of detecting a size of a specific object in the image;
a storage step of storing a target value of the size of the specific object to a storage unit;
a zoom control step of performing auto zoom control that automatically provides a specific zoom operation to make the size of the specific object equal or closer to the target value; and
a focus control step of performing focus control of the image taking optical system based on a contrast evaluation value obtained from the image,
wherein, in the focus control step, in the auto zoom control, a determination of whether or not an in-focus state has been obtained is made before the specific zoom operation.

16. A non-transitory computer readable storage medium storing a computer program that causes an image pickup apparatus to perform operations, the image pickup apparatus including an image pickup unit configured to photoelectrically convert an object image formed by an image taking optical system and an image production unit configured to produce an image by using an output signal from the image pickup unit, the operations comprising:
detecting a size of a specific object in the image;
storing a target value of the size of the specific object to a storage unit;
performing auto zoom control that automatically provides a specific zoom operation to make the size of the specific object equal or closer to the target value; and
performing focus control of the image taking optical system based on a contrast evaluation value obtained from the image,
wherein, in the auto zoom control, the specific zoom operation is restricted until a determination is made that an in-focus state of the image taking optical system has been obtained by the focus control.

17. A non-transitory computer readable storage medium storing a computer program that causes an image pickup apparatus to perform operations, the image pickup apparatus including an image pickup unit configured to photoelectrically convert an object image formed by an image taking optical system and an image production unit configured to produce an image by using an output signal from the image pickup unit, the operations comprising:
detecting a size of a specific object in the image;
storing a target value of the size of the specific object to a storage unit;
performing auto zoom control that automatically provides a specific zoom operation to make the size of the specific object equal or closer to the target value; and
performing focus control of the image taking optical system based on a contrast evaluation value obtained from the image; and
wherein, in the auto zoom control, the specific zoom operation is provided in response to a determination that an in-focus state of the image taking optical system has been obtained by the focus control.

18. A non-transitory computer readable storage medium storing a computer program that causes an image pickup apparatus to perform operations, the image pickup apparatus including an image pickup unit configured to photoelectrically convert an object image formed by an image taking optical system and an image production unit configured to produce an image by using an output signal from the image pickup unit, the operations comprising:
detecting a size of a specific object in the image;
storing a target value of the size of the specific object to a storage unit;
performing auto zoom control that automatically provides a specific zoom operation to make the size of the specific object equal or closer to the target value; and performing focus control of the image taking optical system based on a contrast evaluation value obtained from the image; and wherein, in the auto zoom control, a determination of whether or not an in-focus state has been obtained by the focus control is made before the specific zoom operation.

* * * * *